US012693707B2

(12) United States Patent
Esaka et al.

(10) Patent No.: US 12,693,707 B2
(45) Date of Patent: Jul. 28, 2026

(54) PORTABLE INFORMATION TERMINAL, TERMINAL BODY, AND ATTACHMENT

(71) Applicant: Maxell, Ltd., Kyoto (JP)

(72) Inventors: Fumiaki Esaka, Kyoto (JP); Hitoshi Akiyama, Kyoto (JP); Junji Shiokawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 19/109,596

(22) PCT Filed: Sep. 7, 2022

(86) PCT No.: PCT/JP2022/033517
§ 371 (c)(1),
(2) Date: Mar. 7, 2025

(87) PCT Pub. No.: WO2024/053002
PCT Pub. Date: Mar. 14, 2024

(65) Prior Publication Data
US 2026/0099172 A1 Apr. 9, 2026

(51) Int. Cl.
*G06F 1/16* (2006.01)
*G06F 3/14* (2006.01)

(52) U.S. Cl.
CPC ............ *G06F 1/1639* (2013.01); *G06F 1/163* (2013.01); *G06F 3/14* (2013.01)

(58) Field of Classification Search
CPC ........................................................ G06F 1/163
See application file for complete search history.

(56) References Cited

U.S. PATENT DOCUMENTS 6,771,294 B1 * 8/2004 Pulli ........................ G06F 3/011 715/764
8,228,315 B1 * 7/2012 Starner ................. G06F 3/0304 345/175
(Continued)

FOREIGN PATENT DOCUMENTS

CN 206209303 U 5/2017
CN 111067206 A 4/2020
(Continued)

OTHER PUBLICATIONS

Japanese Office Action received in corresponding Japanese Application No. 2024-545321 dated Aug. 12, 2025.
(Continued)

*Primary Examiner* — Patrick F Marinelli
(74) *Attorney, Agent, or Firm* — Mattingly & Malur, PC

(57) ABSTRACT

In a portable information terminal to which an image projection function can be added, there is provided a technique for improving visibility of a projected image. The portable information terminal has a terminal body and an attachment attached to the terminal body and communicatively connected to the terminal body. The attachment has a projector for projecting an image based on image information obtained from the terminal body, and is configured such that a projection opening direction of the projector is variable with respect to the terminal body. The terminal body or the attachment identifies a state of the portable information terminal including a position of the attachment with respect to the terminal body. The terminal body or the attachment performs a projection control of the image based on the identified state. The projection control includes, for example, an image rotation control, an image shape control, or a projection angle control.

20 Claims, 34 Drawing Sheets

21

(56) References Cited

U.S. PATENT DOCUMENTS

Figure 1A:
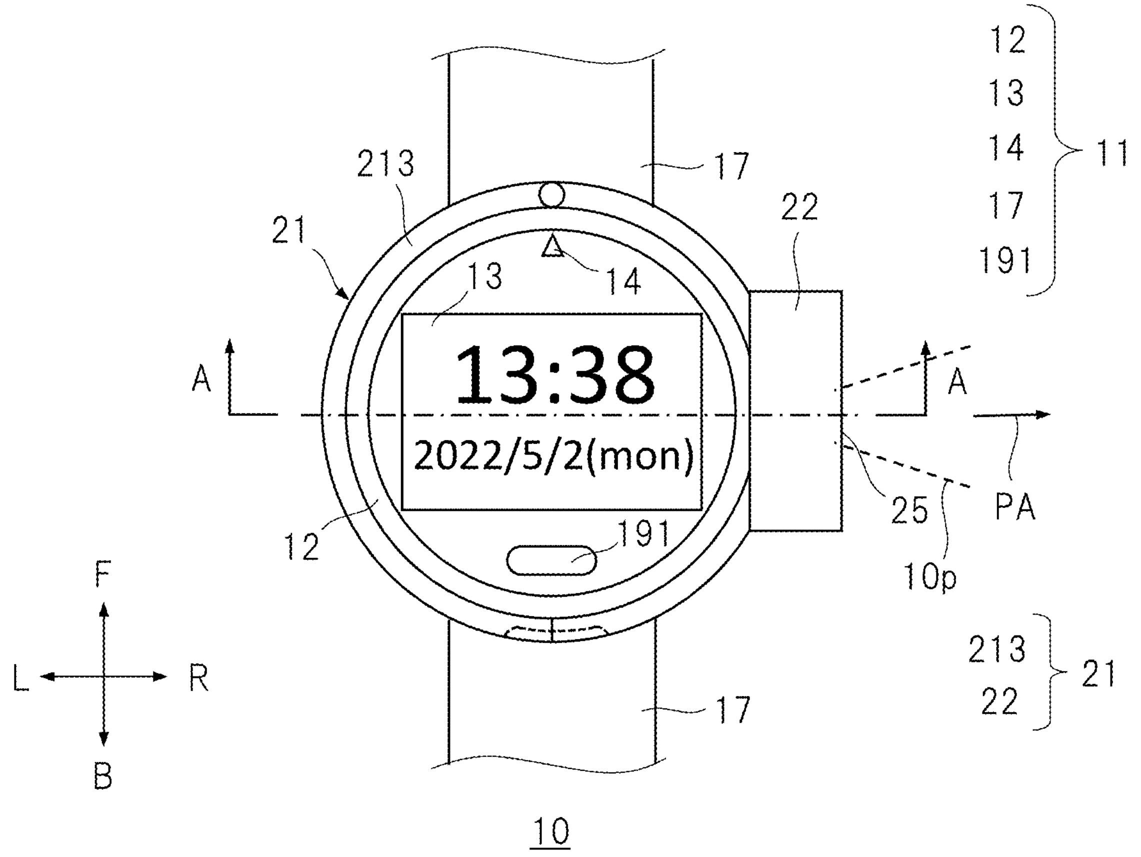

| | | | | |
|---|---|---|---|---|
| 8,743,079 | B2 * | 6/2014 | Norieda | G06F 3/038<br>345/173 |
| 9,651,991 | B2 * | 5/2017 | Kim | G06F 1/1639 |
| 9,727,131 | B2 * | 8/2017 | Lim | G06F 3/011 |
| 9,819,915 | B2 * | 11/2017 | Ku | G06F 1/163 |
| 9,846,529 | B2 * | 12/2017 | Brehmer | G06F 1/163 |
| 9,958,902 | B2 * | 5/2018 | Norieda | G06F 1/163 |
| 10,168,769 | B2 * | 1/2019 | Norieda | G06F 3/014 |
| 10,209,513 | B2 * | 2/2019 | Woo | H04N 23/631 |
| 10,372,160 | B2 * | 8/2019 | Lee | A61B 5/6831 |
| 10,372,229 | B2 * | 8/2019 | Norieda | G06F 3/042 |
| 10,558,273 | B2 * | 2/2020 | Park | G06F 3/042 |
| 10,585,532 | B2 * | 3/2020 | Kline | H04N 9/3194 |
| 10,698,535 | B2 * | 6/2020 | Norieda | G06F 3/014 |
| 10,795,445 | B2 * | 10/2020 | Keller | G06F 3/016 |
| 10,824,235 | B2 * | 11/2020 | Keller | G06F 3/017 |
| 10,908,642 | B2 * | 2/2021 | Park | G06V 40/10 |
| 11,106,273 | B2 * | 8/2021 | Hazra | G06F 3/017 |
| 11,467,670 | B2 * | 10/2022 | Keller | G06F 3/017 |
| 11,747,769 | B2 * | 9/2023 | Connor | G04G 17/08<br>368/10 |
| 12,170,745 | B1 * | 12/2024 | Rao | G06F 3/005 |
| 12,468,435 | B2 * | 11/2025 | Wan | G06F 3/0482 |
| 12,498,755 | B2 * | 12/2025 | Her | G02B 27/18 |
| 12,541,246 | B2 * | 2/2026 | Akiyama | G06F 3/011 |
| 2010/0199232 | A1 * | 8/2010 | Mistry | G06F 3/0426<br>715/863 |
| 2013/0009870 | A1 * | 1/2013 | Norieda | G06F 3/011<br>345/156 |
| 2014/0055352 | A1 * | 2/2014 | Davis | G06F 3/014<br>345/156 |
| 2014/0347295 | A1 * | 11/2014 | Kim | G06F 3/017<br>345/173 |
| 2015/0054730 | A1 * | 2/2015 | Kodama | G06F 1/163<br>345/520 |
| 2015/0309535 | A1 * | 10/2015 | Connor | A61B 5/1477<br>361/679.03 |
| 2015/0323998 | A1 * | 11/2015 | Kudekar | G06F 1/163<br>345/156 |
| 2016/0127624 | A1 * | 5/2016 | Woo | G06F 3/011<br>348/36 |
| 2016/0291768 | A1 * | 10/2016 | Cho | G06F 3/017 |
| 2016/0349790 | A1 * | 12/2016 | Connor | G06F 3/017 |
| 2017/0123487 | A1 * | 5/2017 | Hazra | G06F 3/0482 |
| 2017/0251186 | A1 * | 8/2017 | Ku | H04N 9/3155 |
| 2017/0255838 | A1 * | 9/2017 | Norieda | G06V 20/20 |
| 2017/0319134 | A1 * | 11/2017 | Lee | A61B 5/6831 |
| 2018/0011447 | A1 | 1/2018 | Yoshizumi et al. | |
| 2018/0074653 | A1 * | 3/2018 | Pommier | G06F 3/0488 |
| 2018/0113569 | A1 * | 4/2018 | Pommier | G06F 1/163 |
| 2018/0150186 | A1 * | 5/2018 | Norieda | G06F 3/0304 |
| 2019/0212822 | A1 * | 7/2019 | Keller | G06F 3/0426 |
| 2019/0212823 | A1 * | 7/2019 | Keller | G06F 3/0426 |
| 2019/0294300 | A1 * | 9/2019 | Kline | G06F 3/0425 |
| 2020/0073435 | A1 * | 3/2020 | Park | G06F 1/163 |
| 2021/0311553 | A1 * | 10/2021 | Keller | G06T 19/006 |
| 2022/0011855 | A1 * | 1/2022 | Hazra | G06F 1/163 |
| 2022/0357707 | A1 * | 11/2022 | Connor | G04G 21/02 |
| 2023/0033151 | A1 * | 2/2023 | Her | G02B 27/18 |
| 2023/0376113 | A1 * | 11/2023 | Sanchez | G06F 1/163 |

FOREIGN PATENT DOCUMENTS

| | | | |
|---|---|---|---|
| CN | 215991068 | U | 3/2022 |
| JP | 2003-38217 | A | 2/2003 |
| JP | 2007-96542 | A | 4/2007 |
| JP | 2010-170048 | A | 8/2010 |
| JP | 2010-246030 | A | 10/2010 |
| JP | 2020-24569 | A | 2/2020 |
| JP | 2022-23057 | A | 2/2022 |

OTHER PUBLICATIONS

International Search Report of PCT/JP2022/033517 Dated Nov. 15, 2022.

* cited by examiner

10

21

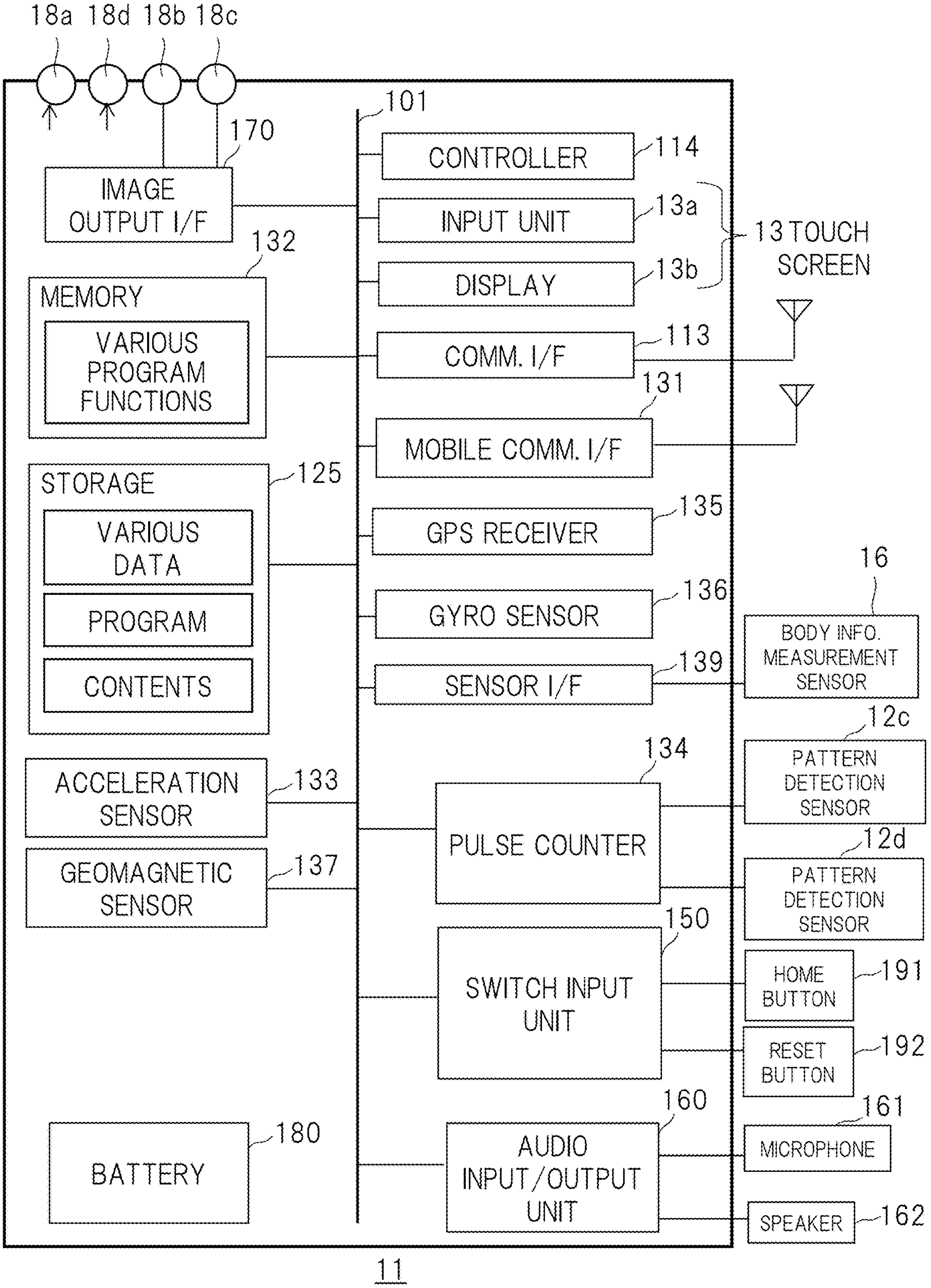

*FIG. 11*

18a 18d 18b 18c

170

IMAGE OUTPUT I/F

132

MEMORY

VARIOUS PROGRAM FUNCTIONS

STORAGE   125

VARIOUS DATA

PROGRAM

CONTENTS

ACCELERATION SENSOR   133

GEOMAGNETIC SENSOR   137

BATTERY   180

101

CONTROLLER   114

INPUT UNIT   13a

DISPLAY   13b

13 TOUCH SCREEN

COMM. I/F   113

MOBILE COMM. I/F   131

GPS RECEIVER   135

GYRO SENSOR   136

SENSOR I/F   139

16

BODY INFO. MEASUREMENT SENSOR

12c

PATTERN DETECTION SENSOR

PULSE COUNTER   134

12d

PATTERN DETECTION SENSOR

SWITCH INPUT UNIT   150

HOME BUTTON   191

RESET BUTTON   192

AUDIO INPUT/OUTPUT UNIT   160

MICROPHONE   161

SPEAKER   162

11

FIG. 24

T01

| SETTING INFORMATION TABLE ATTACHMENT POSITION: LEFT ARM, OUTSIDE | | |
|---|---|---|
| ATTACHMENT ROTATION POSITION | TERMINAL BODY POSTURE | SETTING INFORMATION |
| ⋮ | ⋮ | ⋮ |

T02

| SETTING INFORMATION TABLE ATTACHMENT POSITION: RIGHT ARM, OUTSIDE | | |
|---|---|---|
| ATTACHMENT ROTATION POSITION | TERMINAL BODY POSTURE | SETTING INFORMATION |
| ⋮ | ⋮ | ⋮ |

T03

| SETTING INFORMATION TABLE ATTACHMENT POSITION: LEFT ARM, INSIDE | | |
|---|---|---|
| ATTACHMENT ROTATION POSITION | TERMINAL BODY POSTURE | SETTING INFORMATION |
| ⋮ | ⋮ | ⋮ |

T04

| SETTING INFORMATION TABLE ATTACHMENT POSITION: RIGHT ARM, INSIDE | | |
|---|---|---|
| ATTACHMENT ROTATION POSITION | TERMINAL BODY POSTURE | SETTING INFORMATION |
| ⋮ | ⋮ | ⋮ |

FIG. 25

T01

| SETTING INFORMATION TABLE ATTACHMENT POSITION: LEFT ARM, OUTSIDE | | |
|---|---|---|
| ATTACHMENT ROTATION POSITION | TERMINAL BODY POSTURE | SETTING INFORMATION |
| 12 O'CLOCK DIRECTION | HORIZONTAL | J(1,1,12,1) |
| | FRONT-UPWARD TILT (SMALL) | J(1,1,12,2) |
| | REAR-UPWARD TILT (SMALL) | J(1,1,12,3) |
| | LEFT-UPWARD TILT (SMALL) | J(1,1,12,4) |
| | RIGHT-UPWARD TILT (SMALL) | J(1,1,12,5) |
| | FRONT-UPWARD TILT (LARGE) | J(1,1,12,6) |
| | REAR-UPWARD TILT (LARGE) | J(1,1,12,7) |
| | LEFT-UPWARD TILT (LARGE) | J(1,1,12,8) |
| | RIGHT-UPWARD TILT (LARGE) | J(1,1,12,9) |
| 1 O'CLOCK DIRECTION | HORIZONTAL | J(1,1,1,1) |
| | FRONT-UPWARD TILT (SMALL) | J(1,1,1,2) |
| | REAR-UPWARD TILT (SMALL) | J(1,1,1,3) |
| | LEFT-UPWARD TILT (SMALL) | J(1,1,1,4) |
| | RIGHT-UPWARD TILT (SMALL) | J(1,1,1,5) |
| | FRONT-UPWARD TILT (LARGE) | J(1,1,1,6) |
| | REAR-UPWARD TILT (LARGE) | J(1,1,1,7) |
| | LEFT-UPWARD TILT (LARGE) | J(1,1,1,8) |
| | RIGHT-UPWARD TILT (LARGE) | J(1,1,1,9) |
| ⋮ | ⋮ | ⋮ |
| 11 O'CLOCK DIRECTION | HORIZONTAL | J(1,1,11,1) |
| | FRONT-UPWARD TILT (SMALL) | J(1,1,11,2) |
| | REAR-UPWARD TILT (SMALL) | J(1,1,11,3) |
| | LEFT-UPWARD TILT (SMALL) | J(1,1,11,4) |
| | RIGHT-UPWARD TILT (SMALL) | J(1,1,11,5) |
| | FRONT-UPWARD TILT (LARGE) | J(1,1,11,6) |
| | REAR-UPWARD TILT (LARGE) | J(1,1,11,7) |
| | LEFT-UPWARD TILT (LARGE) | J(1,1,11,8) |
| | RIGHT-UPWARD TILT (LARGE) | J(1,1,11,9) |

FIG. 26

AP1

| ATTACHMENT ROTATION POSITION | ATTACHMENT ROTATION ANGLE $\alpha$ |
|---|---|
| 12 O'CLOCK DIRECTION | $255° \leqq \alpha < 285°$ |
| 1 O'CLOCK DIRECTION | $285° \leqq \alpha < 315°$ |
| 2 O'CLOCK DIRECTION | $315° \leqq \alpha < 345°$ |
| 3 O'CLOCK DIRECTION (INITIAL STATE) | $345° \leqq \alpha < 15°$ |
| 4 O'CLOCK DIRECTION | $15° \leqq \alpha < 45°$ |
| 5 O'CLOCK DIRECTION | $45° \leqq \alpha < 75°$ |
| 6 O'CLOCK DIRECTION | $75° \leqq \alpha < 105°$ |
| 7 O'CLOCK DIRECTION | $105° \leqq \alpha < 135°$ |
| 8 O'CLOCK DIRECTION | $135° \leqq \alpha < 165°$ |
| 9 O'CLOCK DIRECTION | $165° \leqq \alpha < 195°$ |
| 10 O'CLOCK DIRECTION | $195° \leqq \alpha < 225°$ |
| 11 O'CLOCK DIRECTION | $225° \leqq \alpha < 255°$ |

FIG. 27

HS1

| TERMINAL BODY POSTURE | TILT DIRECTION AND UPWARD TILT ANGLE $\beta$ |
|---|---|
| HORIZONTAL | FRONT/REAR/LEFT/RIGHT $\beta < 15°$ |
| FRONT-UPWARD TILT (SMALL) | FRONT $30° > \beta \geqq 15°$ |
| REAR-UPWARD TILT (SMALL) | REAR $30° > \beta \geqq 15°$ |
| LEFT-UPWARD TILT (SMALL) | RIGHT $30° > \beta \geqq 15°$ |
| RIGHT-UPWARD TILT (SMALL) | LEFT $30° > \beta \geqq 15°$ |
| FRONT-UPWARD TILT (LARGE) | FRONT $\beta \geqq 30°$ |
| REAR-UPWARD TILT (LARGE) | REAR $\beta \geqq 30°$ |
| LEFT-UPWARD TILT (LARGE) | RIGHT $\beta \geqq 30°$ |
| RIGHT-UPWARD TILT (LARGE) | LEFT $\beta \geqq 30°$ |

FIG. 28

T11

| TABLE ATTACHMENT POSITION: LEFT ARM, OUTSIDE | | |
|---|---|---|
| SETTING INFORMATION | SETTING ITEMS | SETTING CONTENTS |
| J(1,1,12,1) | ROTATION CONTROL | 0° |
| | SHAPE CONTROL | LINEAR |
| | PROJECTION ANGLE CONTROL | 0° |
| J(1,1,12,2) | ROTATION CONTROL | 0° |
| | SHAPE CONTROL | LINEAR |
| | PROJECTION ANGLE CONTROL | DOWNWARD 15° |
| J(1,1,12,3) | ROTATION CONTROL | 0° |
| | SHAPE CONTROL | LINEAR |
| | PROJECTION ANGLE CONTROL | UPWARD 15° |
| ⋮ | ⋮ | ⋮ |
| J(1,1,3,1) | ROTATION CONTROL | CW270° |
| | SHAPE CONTROL | FAR SIDE NARROW WIDTH |
| | PROJECTION ANGLE CONTROL | 0° |
| ⋮ | ⋮ | ⋮ |
| J(1,1,6,3) | ROTATION CONTROL | CW180° |
| | SHAPE CONTROL | FAR SIDE NARROW WIDTH |
| | PROJECTION ANGLE CONTROL | DOWNWARD 60° |
| ⋮ | ⋮ | ⋮ |
| J(1,1,9,9) | ROTATION CONTROL | CW90° |
| | SHAPE CONTROL | FAR SIDE NARROW WIDTH |
| | PROJECTION ANGLE CONTROL | DOWNWARD 30° |
| ⋮ | ⋮ | ⋮ |

FIG. 35

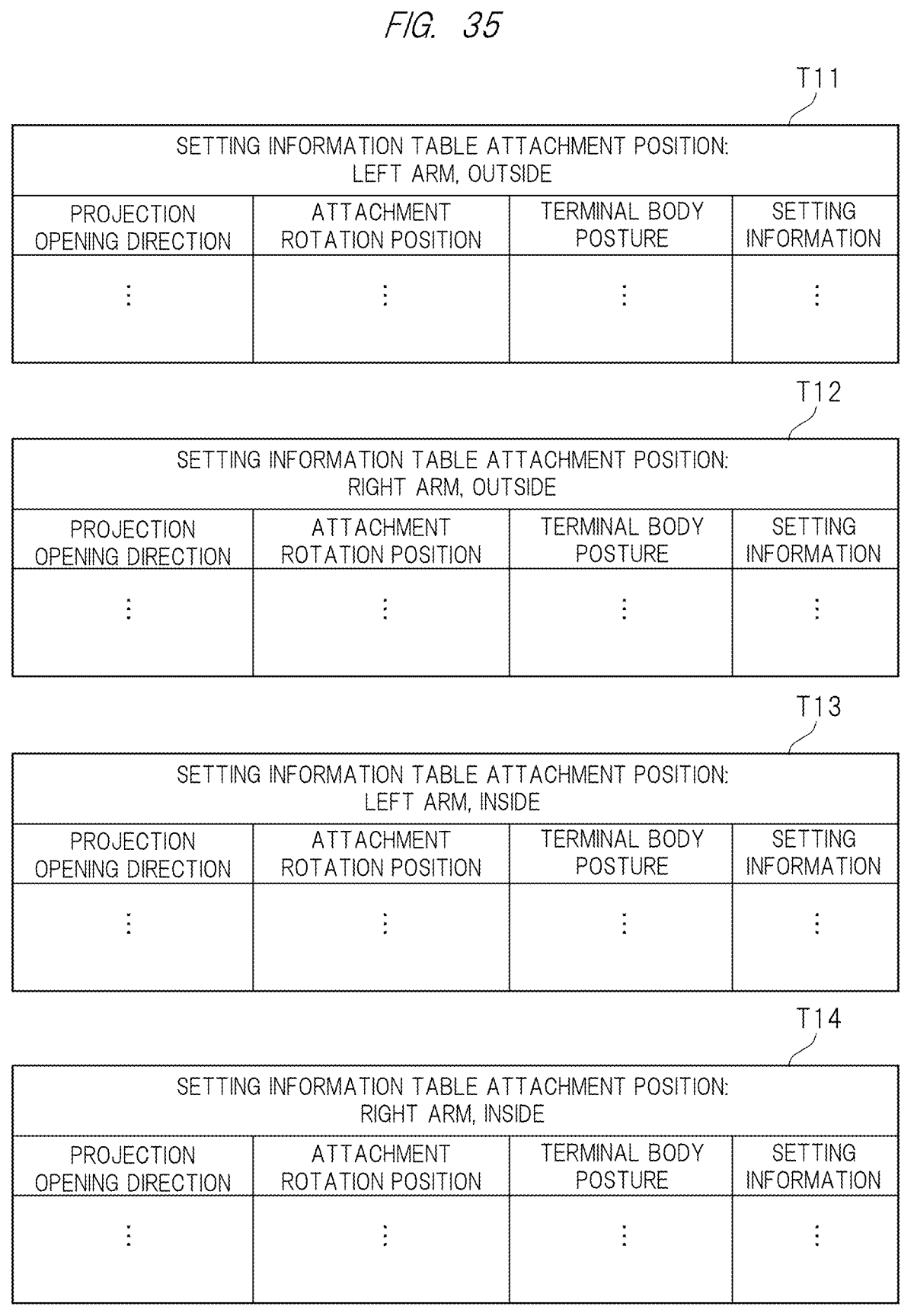

T11

| SETTING INFORMATION TABLE ATTACHMENT POSITION: LEFT ARM, OUTSIDE | | | |
|---|---|---|---|
| PROJECTION OPENING DIRECTION | ATTACHMENT ROTATION POSITION | TERMINAL BODY POSTURE | SETTING INFORMATION |
| ⋮ | ⋮ | ⋮ | ⋮ |

T12

| SETTING INFORMATION TABLE ATTACHMENT POSITION: RIGHT ARM, OUTSIDE | | | |
|---|---|---|---|
| PROJECTION OPENING DIRECTION | ATTACHMENT ROTATION POSITION | TERMINAL BODY POSTURE | SETTING INFORMATION |
| ⋮ | ⋮ | ⋮ | ⋮ |

T13

| SETTING INFORMATION TABLE ATTACHMENT POSITION: LEFT ARM, INSIDE | | | |
|---|---|---|---|
| PROJECTION OPENING DIRECTION | ATTACHMENT ROTATION POSITION | TERMINAL BODY POSTURE | SETTING INFORMATION |
| ⋮ | ⋮ | ⋮ | ⋮ |

T14

| SETTING INFORMATION TABLE ATTACHMENT POSITION: RIGHT ARM, INSIDE | | | |
|---|---|---|---|
| PROJECTION OPENING DIRECTION | ATTACHMENT ROTATION POSITION | TERMINAL BODY POSTURE | SETTING INFORMATION |
| ⋮ | ⋮ | ⋮ | ⋮ |

FIG. 36

T11

| SETTING INFORMATION TABLE ATTACHMENT POSITION: LEFT ARM & BACK-OF-HAND SIDE | | | |
|---|---|---|---|
| PROJECTION OPENING DIRECTION | ATTACHMENT ROTATION POSITION | TERMINAL BODY POSTURE | SETTING INFORMATION |
| BEZEL RADIAL DIRECTION | 12 O'CLOCK DIRECTION | HORIZONTAL | J(1,1,12,1) |
| | | FRONT-UPWARD TILT (SMALL) | J(1,1,12,2) |
| | | REAR-UPWARD TILT (SMALL) | J(1,1,12,3) |
| | ⋮ | ⋮ | ⋮ |
| | 3 O'CLOCK DIRECTION | HORIZONTAL | J(1,1,3,1) |
| | | FRONT-UPWARD TILT (SMALL) | J(1,1,3,2) |
| | | REAR-UPWARD TILT (SMALL) | J(1,1,3,3) |
| | ⋮ | ⋮ | ⋮ |
| | 6 O'CLOCK DIRECTION | HORIZONTAL | J(1,1,6,1) |
| | | FRONT-UPWARD TILT (SMALL) | J(1,1,6,2) |
| | | REAR-UPWARD TILT (SMALL) | J(1,1,6,3) |
| | ⋮ | ⋮ | ⋮ |
| | 9 O'CLOCK DIRECTION | HORIZONTAL | J(1,1,9,1) |
| | | FRONT-UPWARD TILT (SMALL) | J(1,1,9,2) |
| | | REAR-UPWARD TILT (SMALL) | J(1,1,9,3) |
| | ⋮ | ⋮ | ⋮ |
| BEZEL TANGENTIAL DIRECTION | 12 O'CLOCK DIRECTION | HORIZONTAL | J(1,2,12,1) |
| | | FRONT-UPWARD TILT (SMALL) | J(1,2,12,2) |
| | | REAR-UPWARD TILT (SMALL) | J(1,2,12,3) |
| | ⋮ | ⋮ | ⋮ |
| | 3 O'CLOCK DIRECTION | HORIZONTAL | J(1,2,3,1) |
| | | FRONT-UPWARD TILT (SMALL) | J(1,2,3,2) |
| | | REAR-UPWARD TILT (SMALL) | J(1,2,3,3) |
| | ⋮ | ⋮ | ⋮ |
| | 6 O'CLOCK DIRECTION | HORIZONTAL | J(1,2,6,1) |
| | | FRONT-UPWARD TILT (SMALL) | J(1,2,6,2) |
| | | REAR-UPWARD TILT (SMALL) | J(1,2,6,3) |
| | ⋮ | ⋮ | ⋮ |
| | 9 O'CLOCK DIRECTION | HORIZONTAL | J(1,2,9,1) |
| | | FRONT-UPWARD TILT (SMALL) | J(1,2,9,2) |
| | | REAR-UPWARD TILT (SMALL) | J(1,2,9,3) |
| | ⋮ | ⋮ | ⋮ |

10b

10b

PORTABLE INFORMATION TERMINAL, TERMINAL BODY, AND ATTACHMENT

TECHNICAL FIELD

The present invention relates to a portable information terminal, a terminal body, and an attachment.

BACKGROUND ART

In recent years, a type of portable information terminal worn on an arm called a smartwatch has become known. A smartwatch is equipped with a touch screen, various controllers, sensors, and the like. For example, touching a character or an icon displayed on the touch screen allows the user to utilize various functions such as displaying biometric information including heart rate measured by the sensor or displaying status of incoming e-mails.

An example of a type of portable information terminal worn on an arm as described above is known to be equipped with a small display that is separate from a display screen of a terminal body and to have a function for displaying information on the small display such that the user can easily see the information. For example, Patent Document 1 discloses an electronic device as described below.

This electronic device has a housing. The housing has a first portion located in front of the housing, a second portion located on a side of the housing, a first band attachment portion, and a second band attachment portion. The second portion has a function of displaying an image. The first band attachment portion is located on an upper side of the housing as viewed from the front side of the housing. The second portion and the second band attachment portion are located on a lower side of the housing as viewed from the front side of the housing. The first portion has a function of displaying an image or at least one of an hour hand, a minute hand, and a second hand. Such a configuration allows the user to read the displayed information more easily.

RELATED-ART DOCUMENT

Patent Document

[Patent Document 1] Japanese Patent Application Laid-Open Publication No. 2022-23057

SUMMARY OF THE INVENTION

Problems to be Solved by the Invention

The electronic device described in Patent Document 1 has a configuration in which a small display is mounted on a side surface of the housing. Therefore, for example, in such a case where a user wearing the electronic device wishes to share the displayed information to another person, visibility for the other person is not considered. In addition, for example, simply adding a second display screen to a narrow side surface of the electronic device is not user-friendly enough if the user wishes to view a large amount of information. That is, possible improvements can be made regarding visibility of the displayed information.

From the above-described circumstances, it is desired to provide a technique to further improve visibility of information displayed on the portable information terminal.

Means for Solving the Problems

A representative embodiment of the present invention is a portable information terminal to be worn on an arm. The portable information terminal includes a terminal body, and an attachment attached to the terminal body and communicatively connected to the terminal body. The attachment has a projector for projecting an image based on image information obtained from the terminal body, and is configured such that a projection opening direction of the projector is variable with respect to the terminal body. The terminal body or the attachment identifies a state of the portable information terminal including a position of the attachment with respect to the terminal body. The terminal body or the attachment performs a projection control of the image based on the identified state.

A representative embodiment of the present invention is a terminal body configuring a portable information terminal to be worn an arm. The terminal body includes a mechanism for attaching an attachment having a projector for projecting an image, the attachment configured such that a projection opening direction of the projector is variable with respect to the terminal body, a communication unit for exchanging information with the attachment, a generating means for generating image information to be sent to the attachment via the communication unit, and acquirement means for acquiring information representing the projection opening direction from the attachment. The acquirement means edits the image information based on the acquired information.

A representative embodiment of the present invention is an attachment configuring a portable information terminal to be worn on an arm. The attachment is attached to a terminal body of the portable information terminal, and is communicatively connected to the terminal body. The attachment has a projector for projecting an image based on image information obtained from the terminal body, and is configured such that a projection opening direction of the projector is variable with respect to the terminal body. The terminal body or the attachment identifies a state of the portable information terminal including a position of the attachment with respect to the terminal body. The terminal body or the attachment performs a projection control of the image based on the identified state.

Effects of the Invention

According to a representative embodiment of the present invention, a technique to further improve visibility of information displayed on a portable information terminal can be provided.

BRIEF DESCRIPTIONS OF THE DRAWINGS

FIG. 1A A front view of a portable information terminal according to a first embodiment.

Figure 1B:
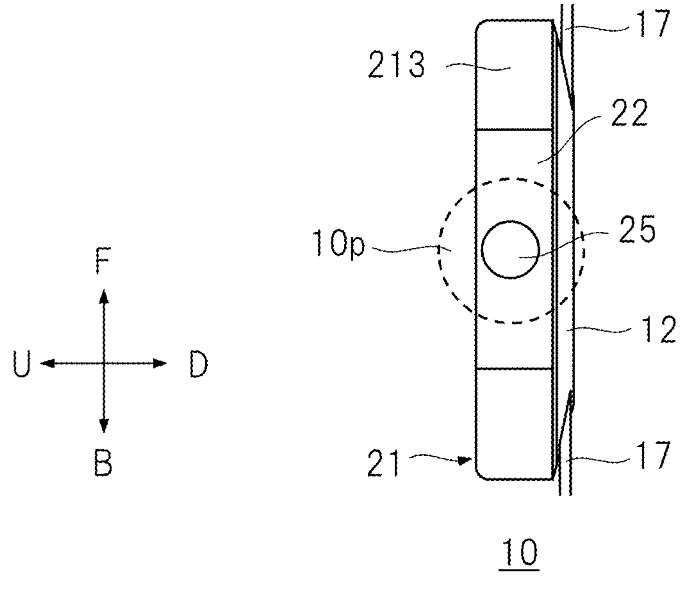

FIG. 1B A side view of the portable information terminal according to the first embodiment.

Figure 2:
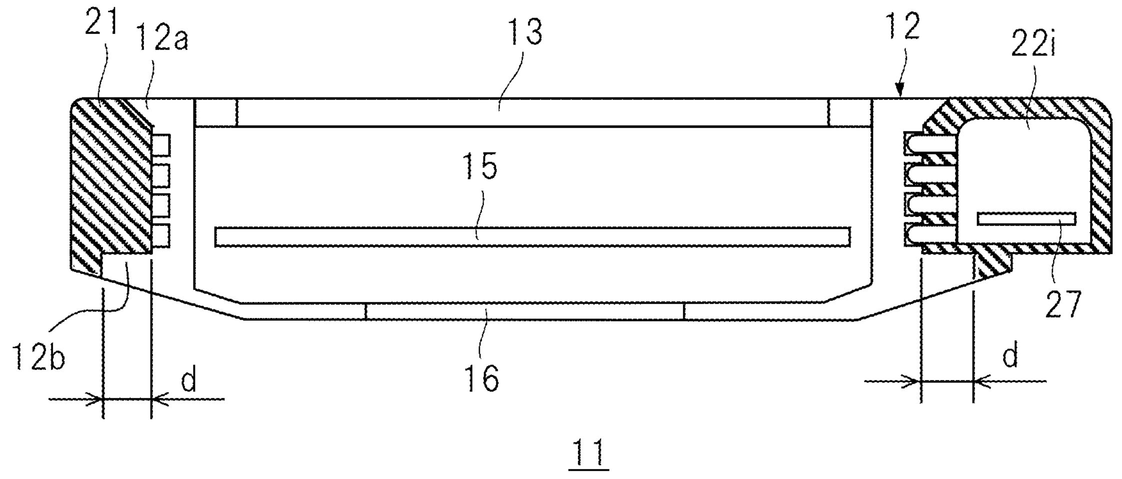

FIG. 2 A cross-sectional view of the portable information terminal shown in FIG. 1, taken along a line A-A.

Figure 3:
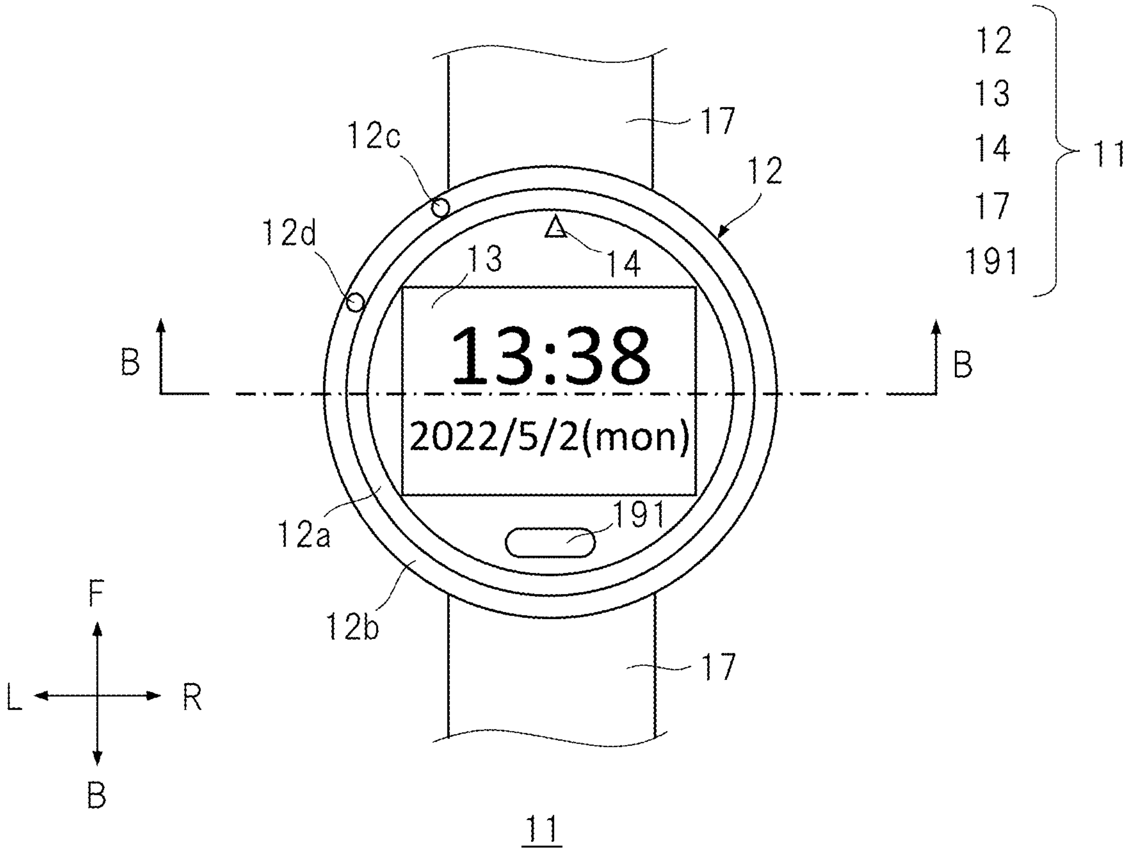

FIG. 3 A front view of a terminal body viewed from a display surface side.

Figure 4:
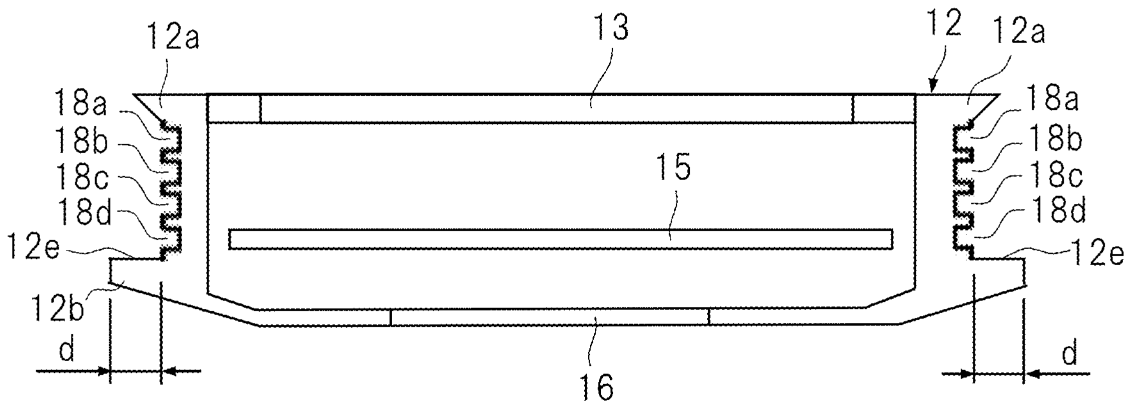

FIG. 4 A cross-sectional view of the terminal body shown in FIG. 3, taken along a line B-B.

Figure 5:
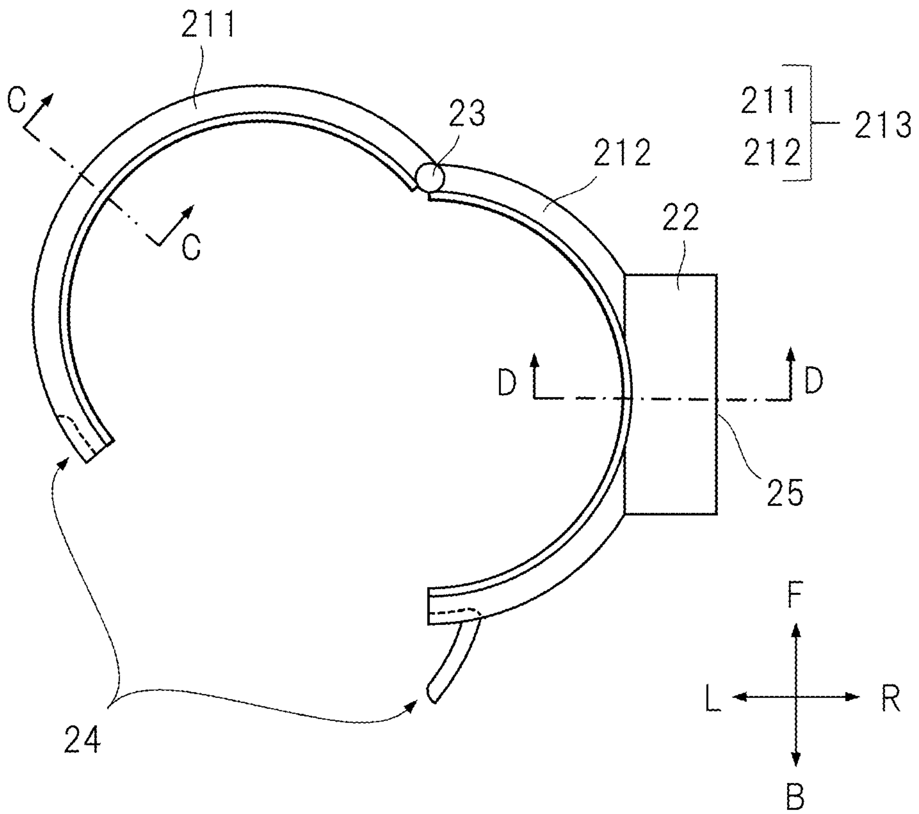

FIG. 5 A front view of an attachment.

Figure 6:
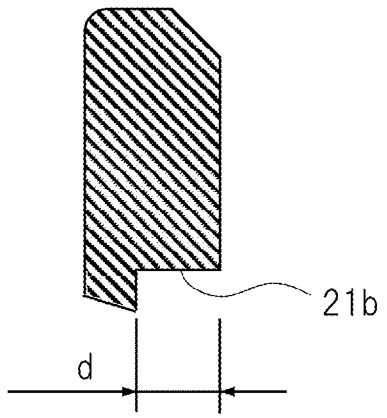

FIG. 6 A cross-sectional view of the attachment shown in FIG. 5, taken along a line C-C.

Figure 7:
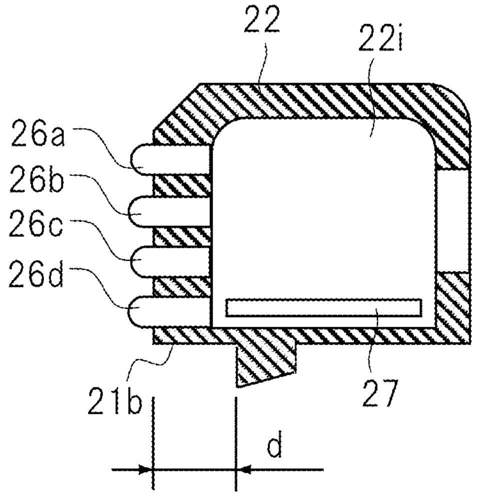

FIG. 7 A cross-sectional view of the attachment shown in FIG. 5, taken along a line D-D.

Figure 8:
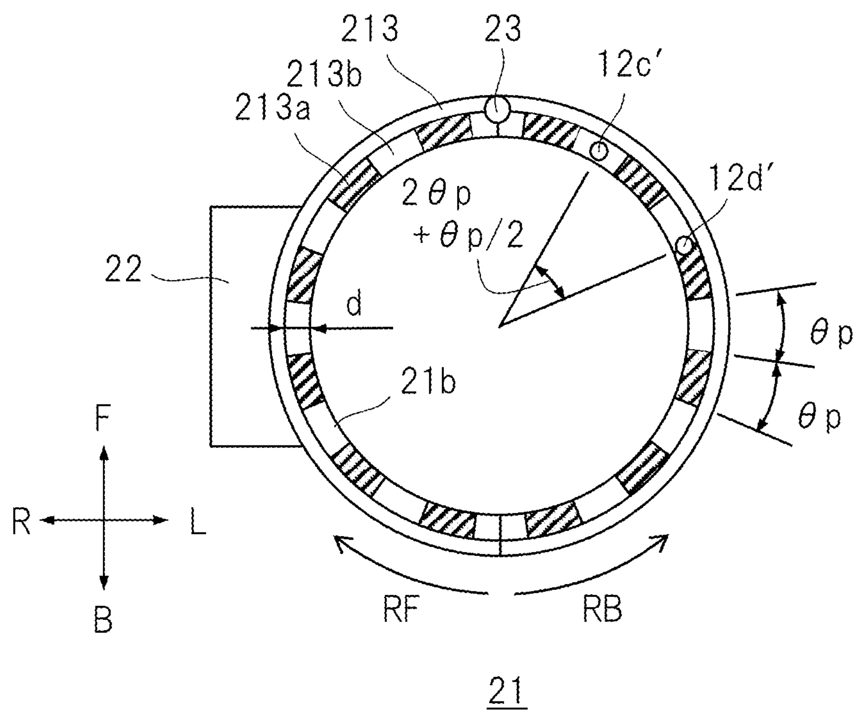

FIG. 8 A rear view of the attachment.

Figure 9:
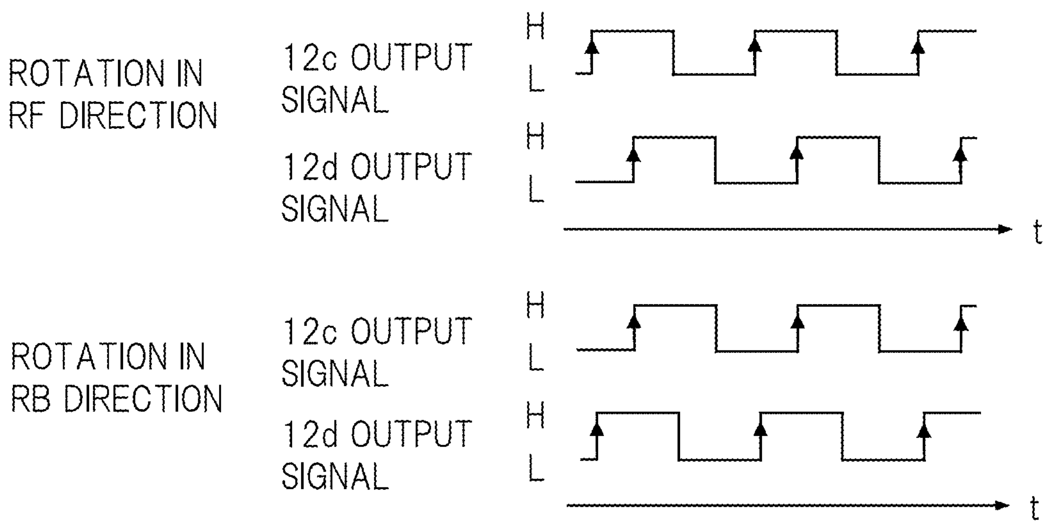

FIG. 9 A timing chart of output signals obtained by pattern detection sensors.

Figure 10:
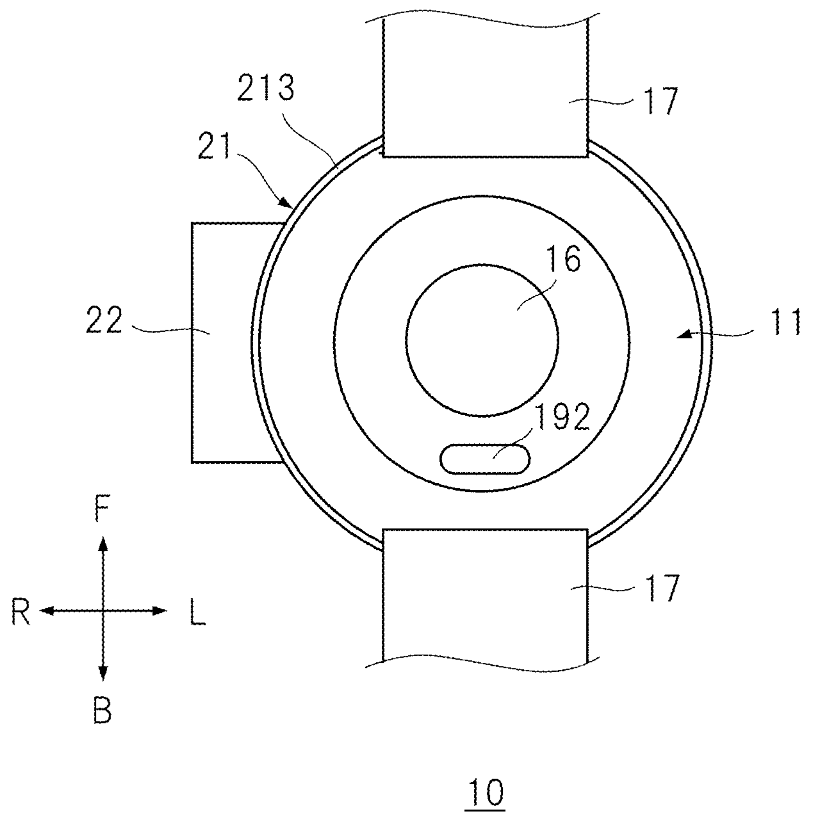

FIG. 10 A rear view of the portable information terminal.

FIG. 11 A drawing showing an example of a hardware configuration of the terminal body.

Figure 12:
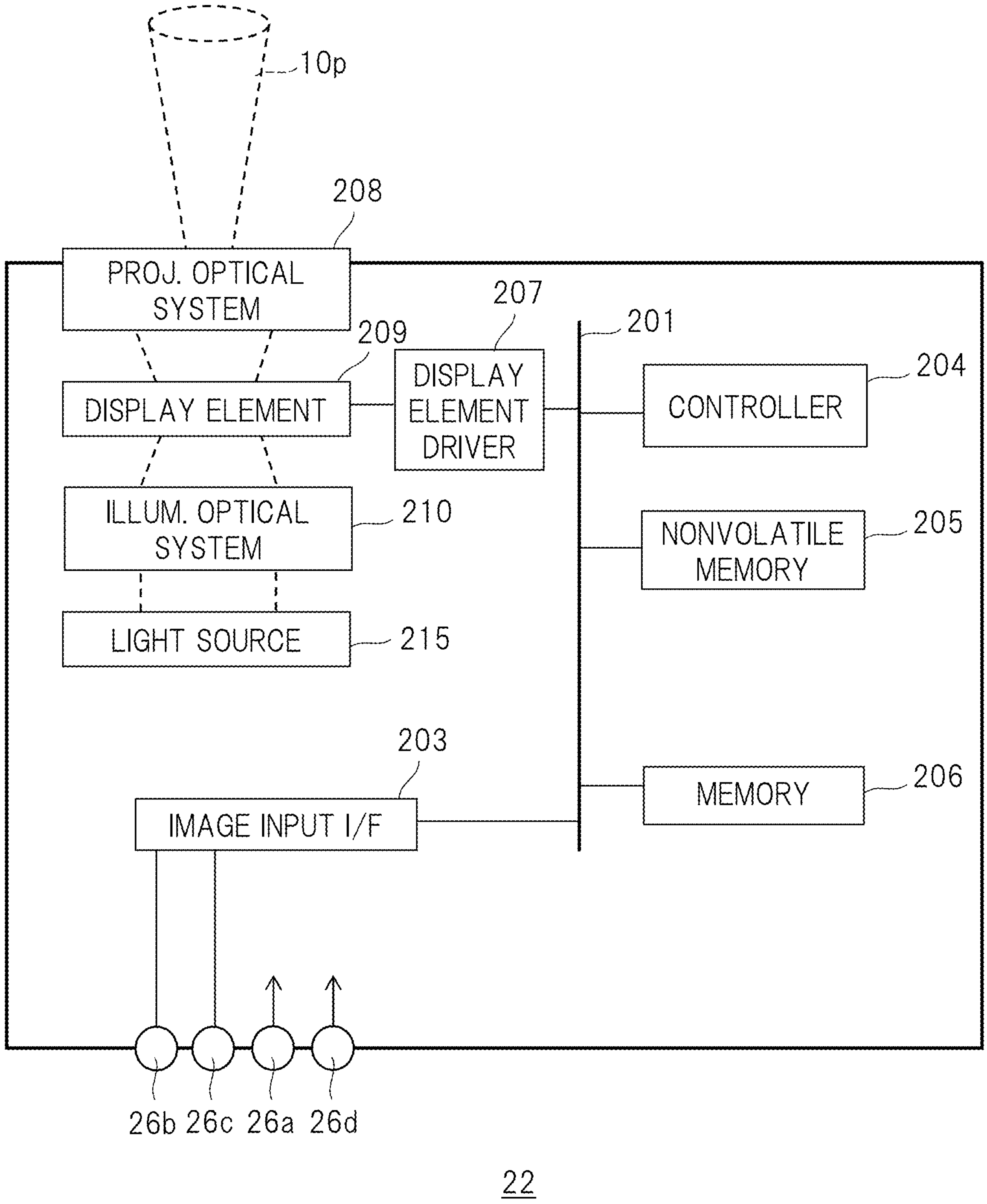

FIG. 12 A drawing showing an example of a configuration of a projector in the attachment.

Figure 13:
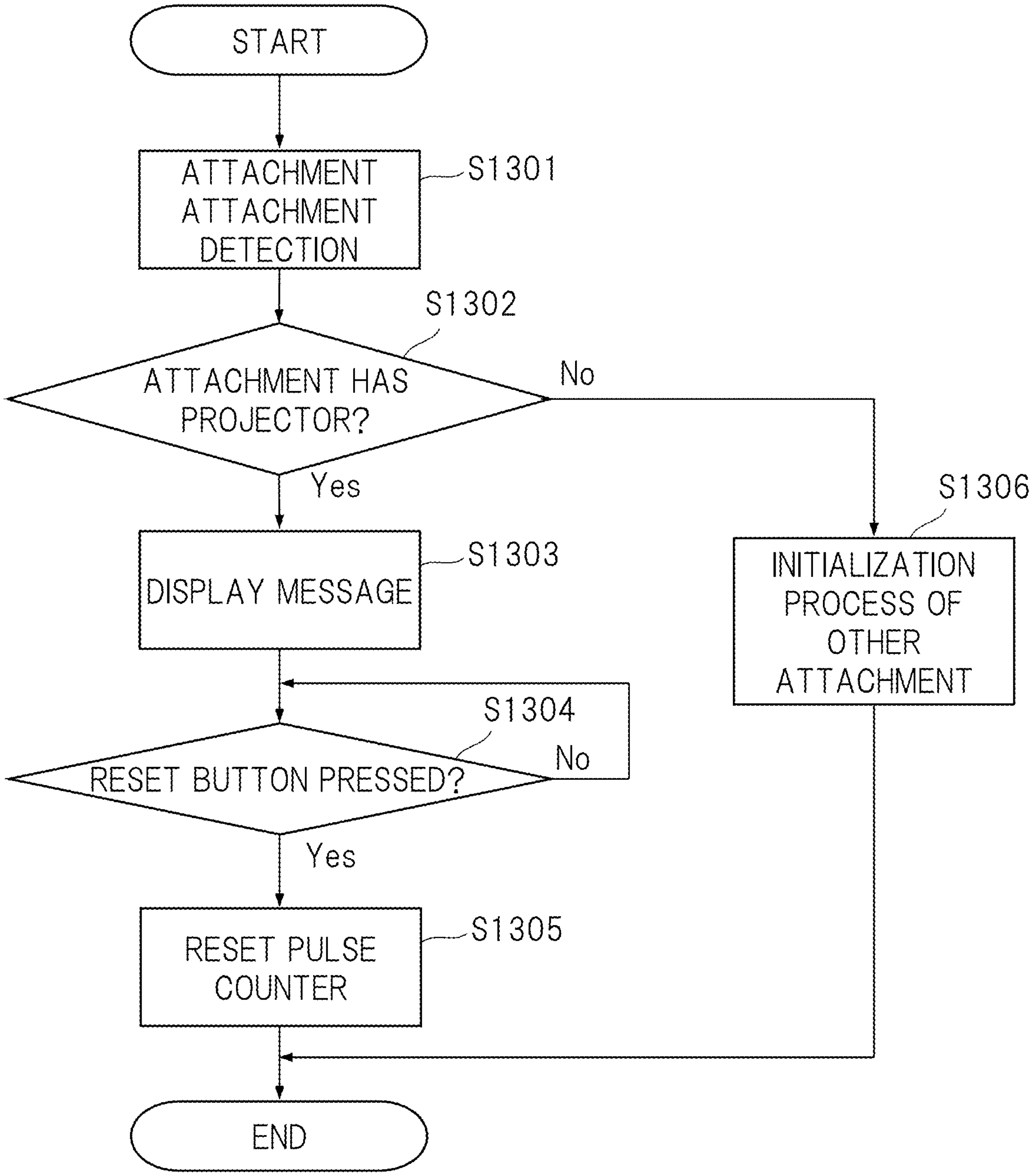

FIG. 13 A flow diagram showing an initialization process when the attachment is attached.

Figure 14:
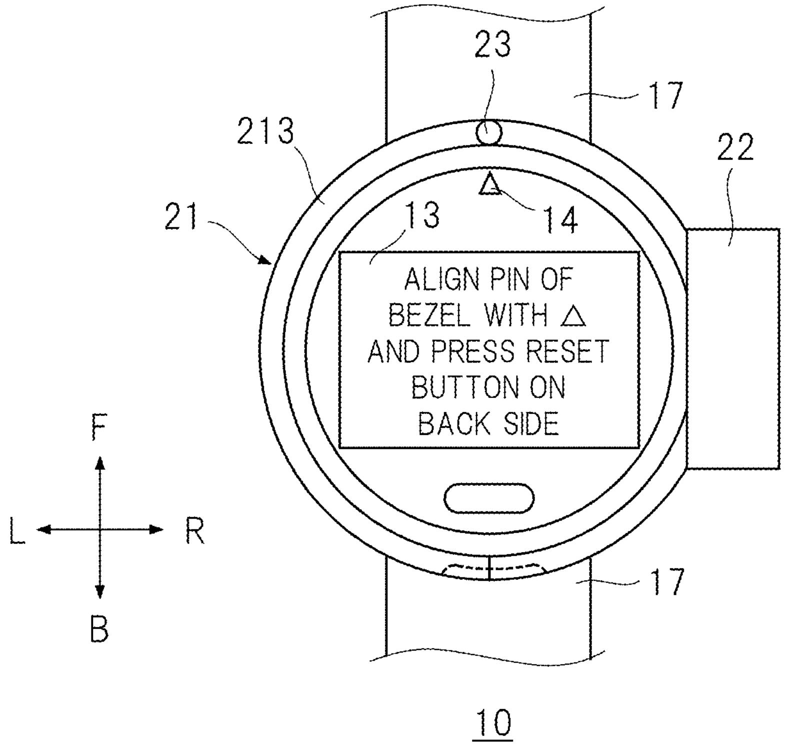

FIG. 14 A drawing showing an example of a displayed message.

Figure 15A:
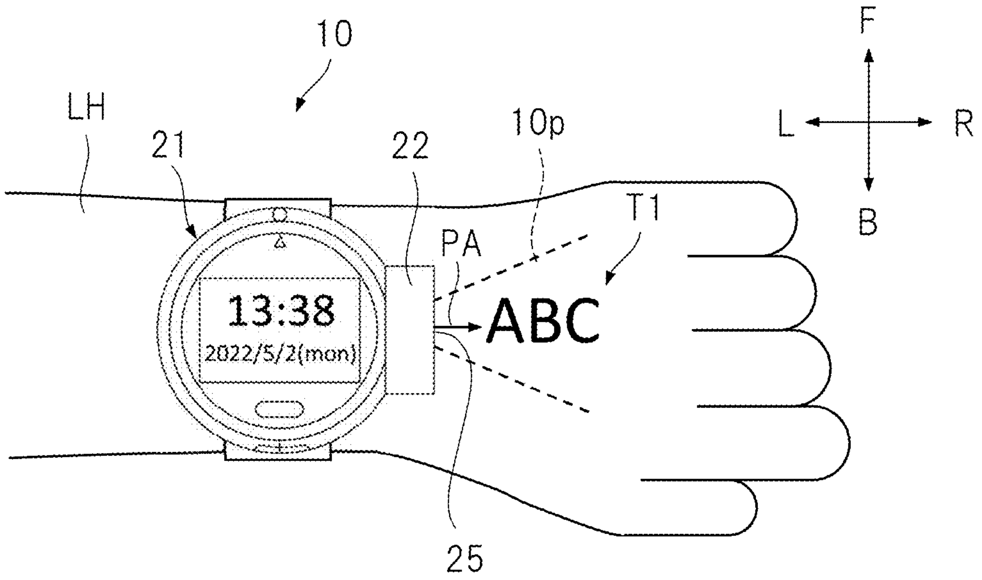

FIG. 15A A front view of the portable information terminal according to a first example.

Figure 15B:
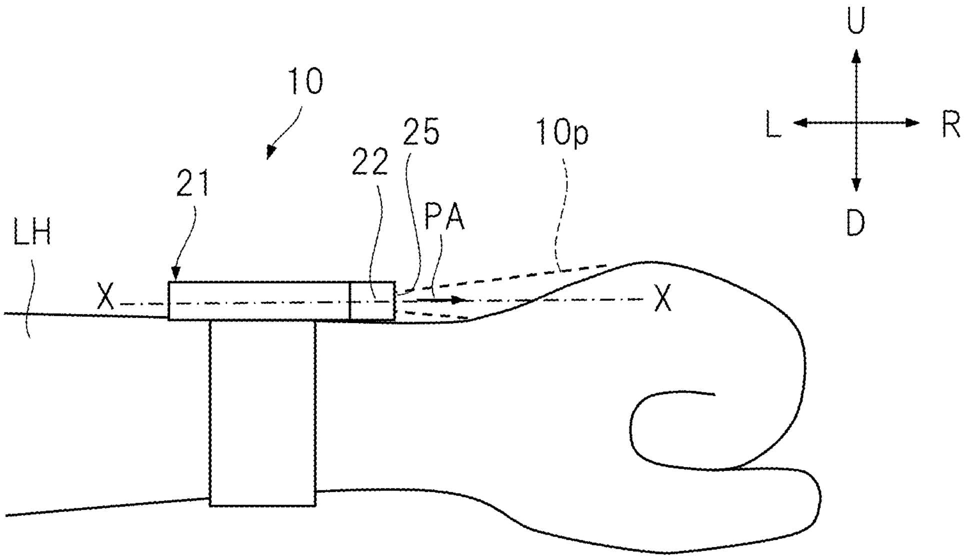

FIG. 15B A side view of the portable information terminal according to the first example.

Figure 16A:
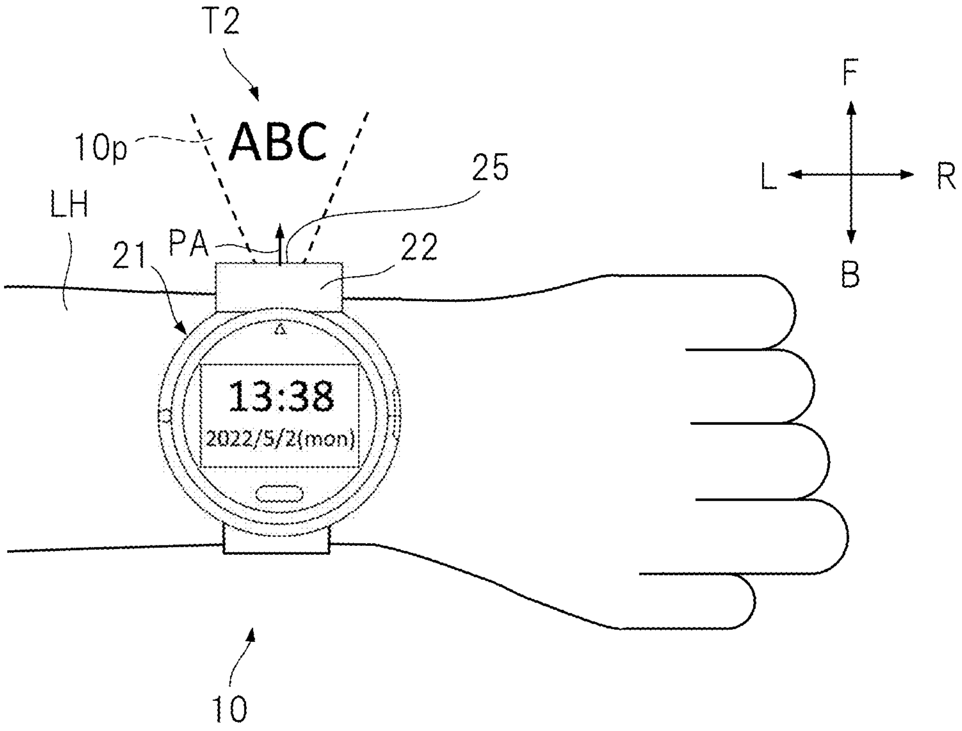

FIG. 16A front view of the portable information terminal according to a second example.

Figure 16B:
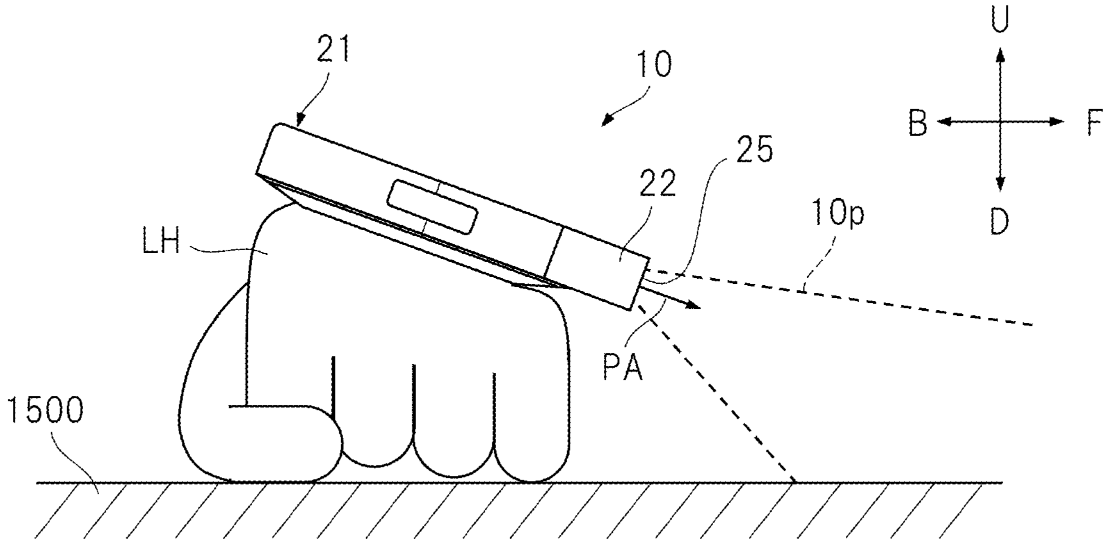

FIG. 16B A side view of the portable information terminal according to the second example.

Figure 17A:
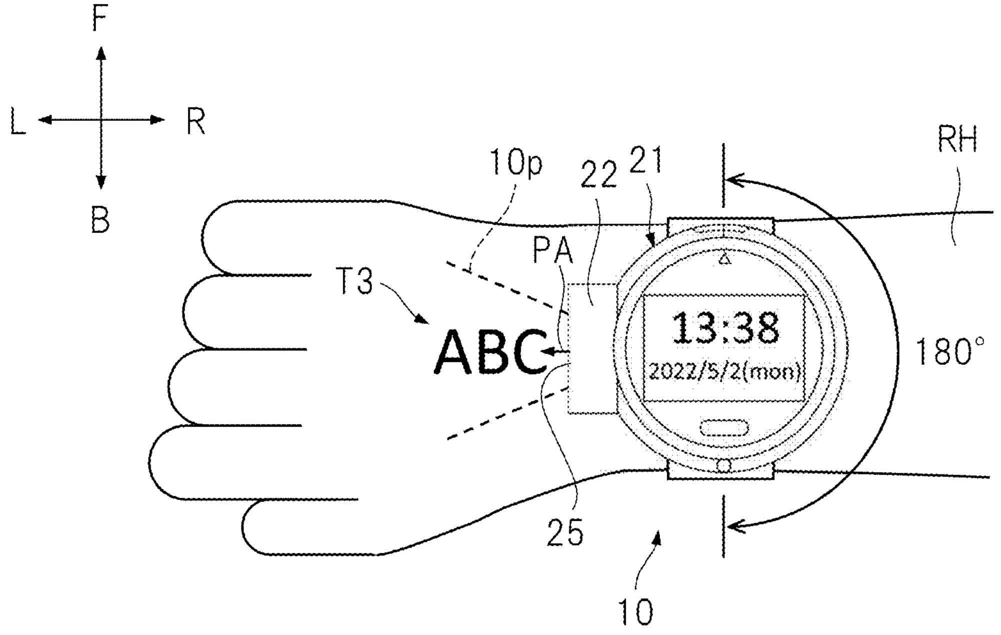

FIG. 17A A front view of the portable information terminal according to a third example.

Figure 17B:
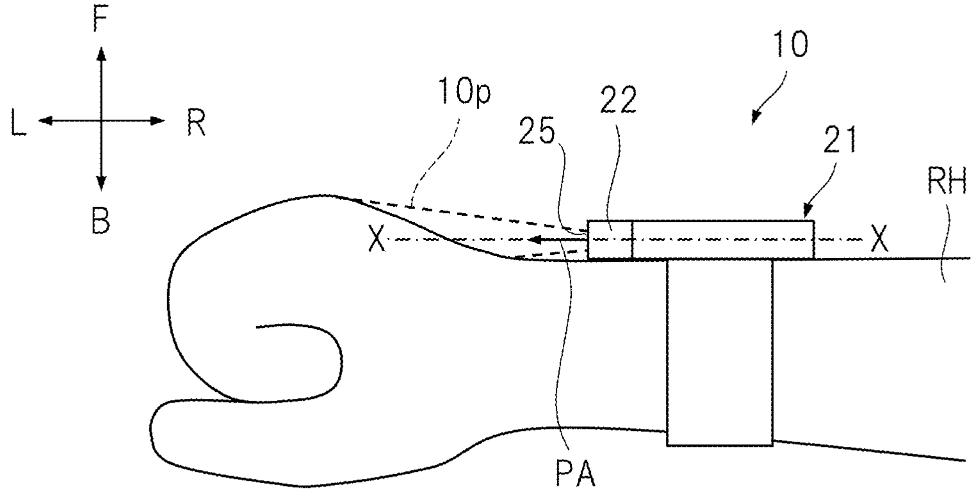

FIG. 17B A side view of the portable information terminal according to the third example.

Figure 18A:
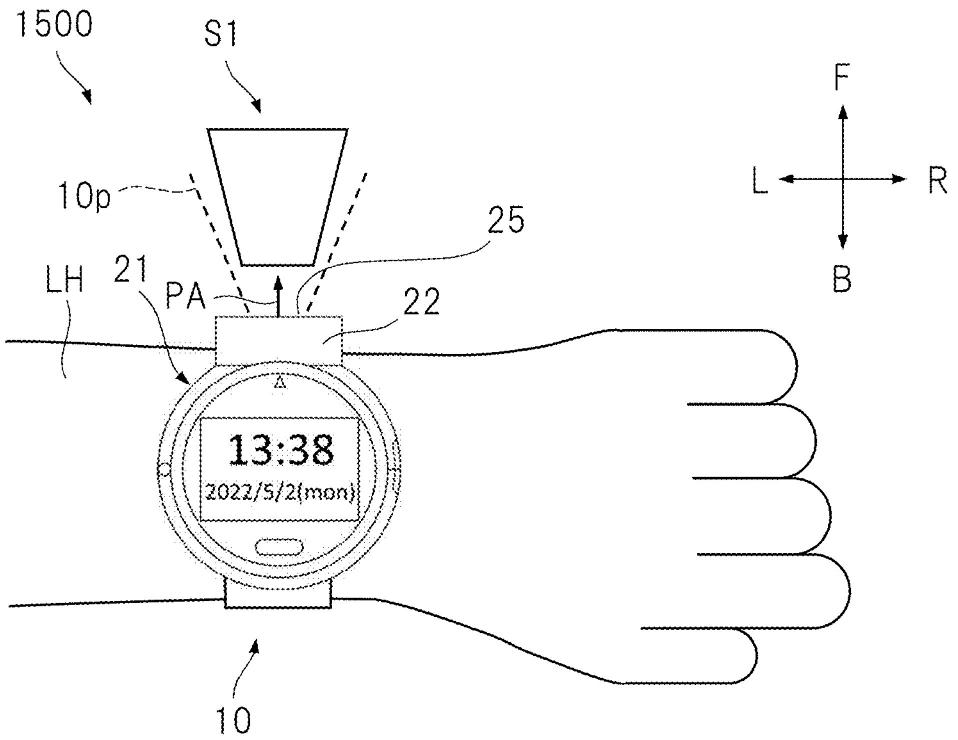

FIG. 18A A front view of the portable information terminal according to a fourth example.

Figure 18B:
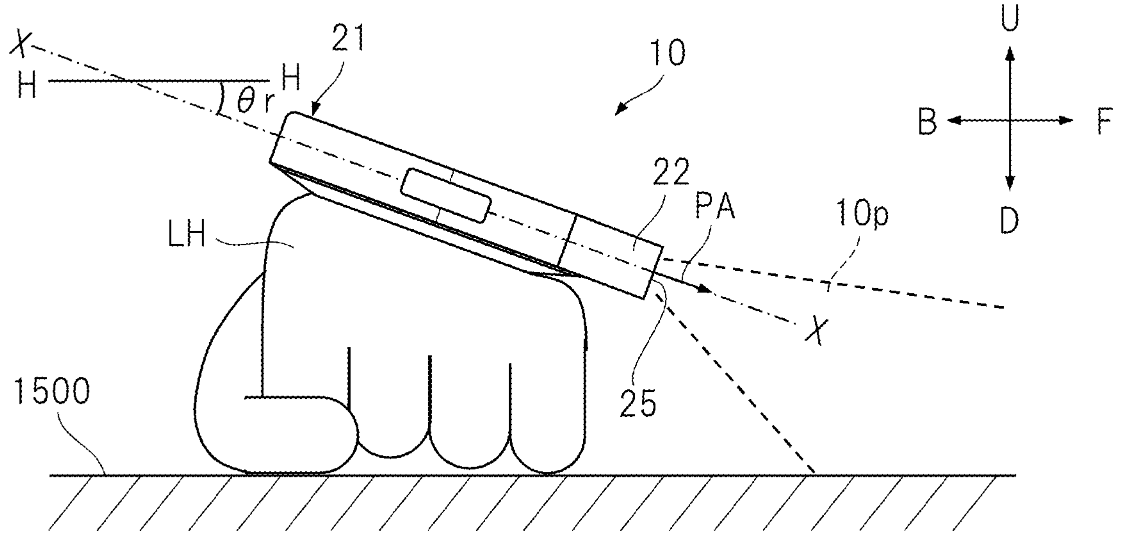

FIG. 18B A side view of the portable information terminal according to the fourth example.

Figure 19:
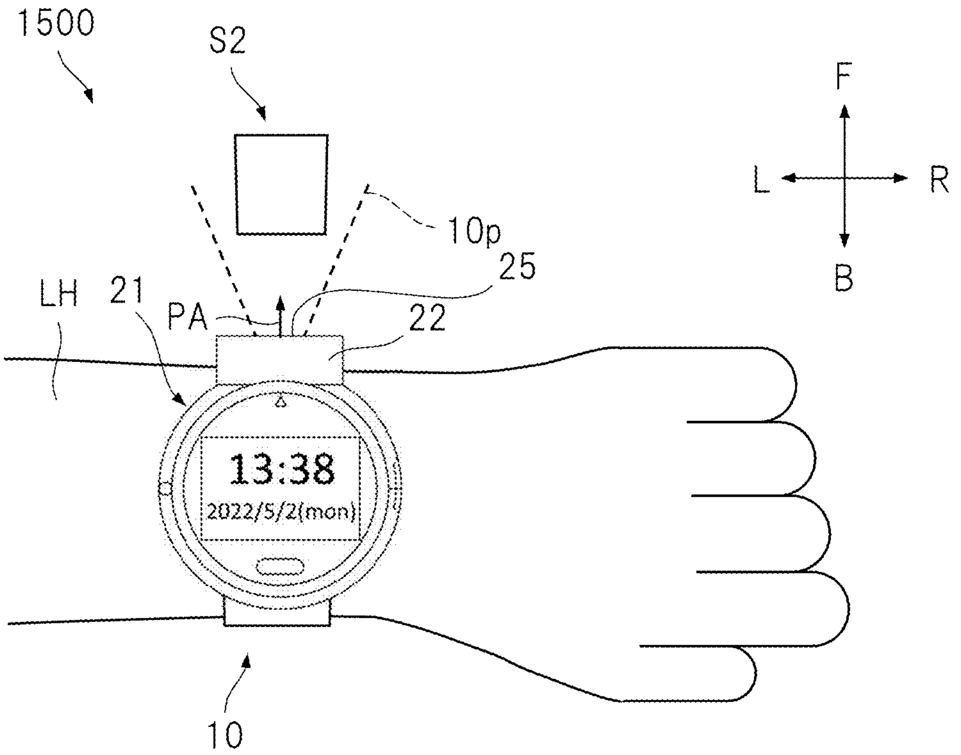

FIG. 19 A front view of the portable information terminal according to a fifth example.

Figure 20A:
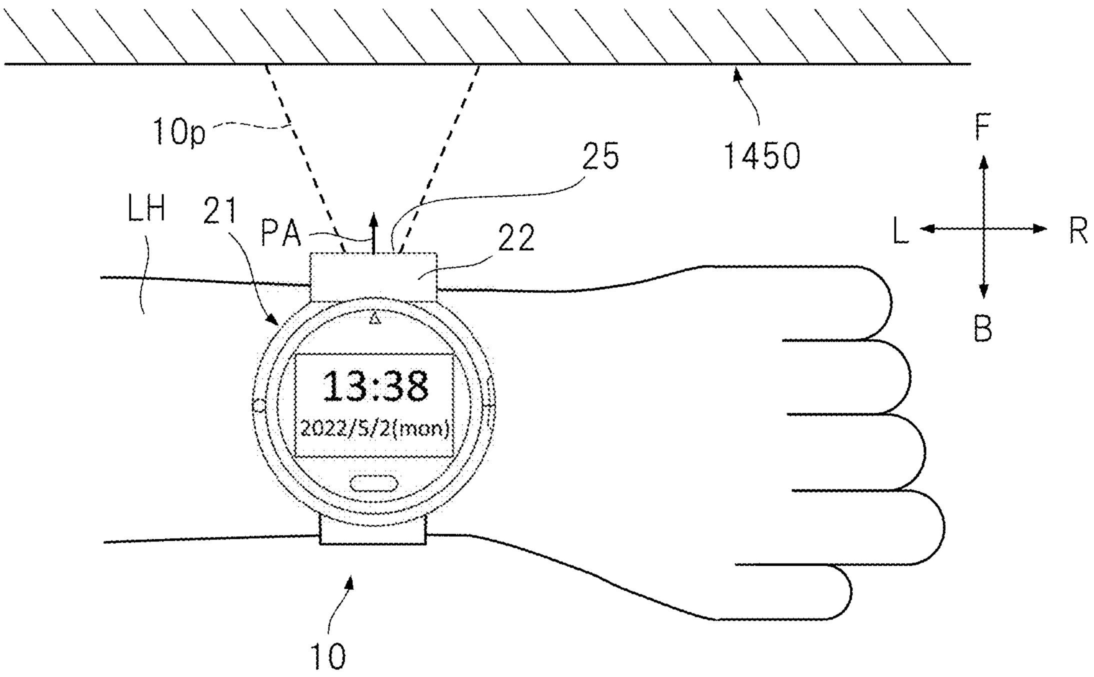

FIG. 20A A front view of the portable information terminal according to a sixth example.

Figure 20B:
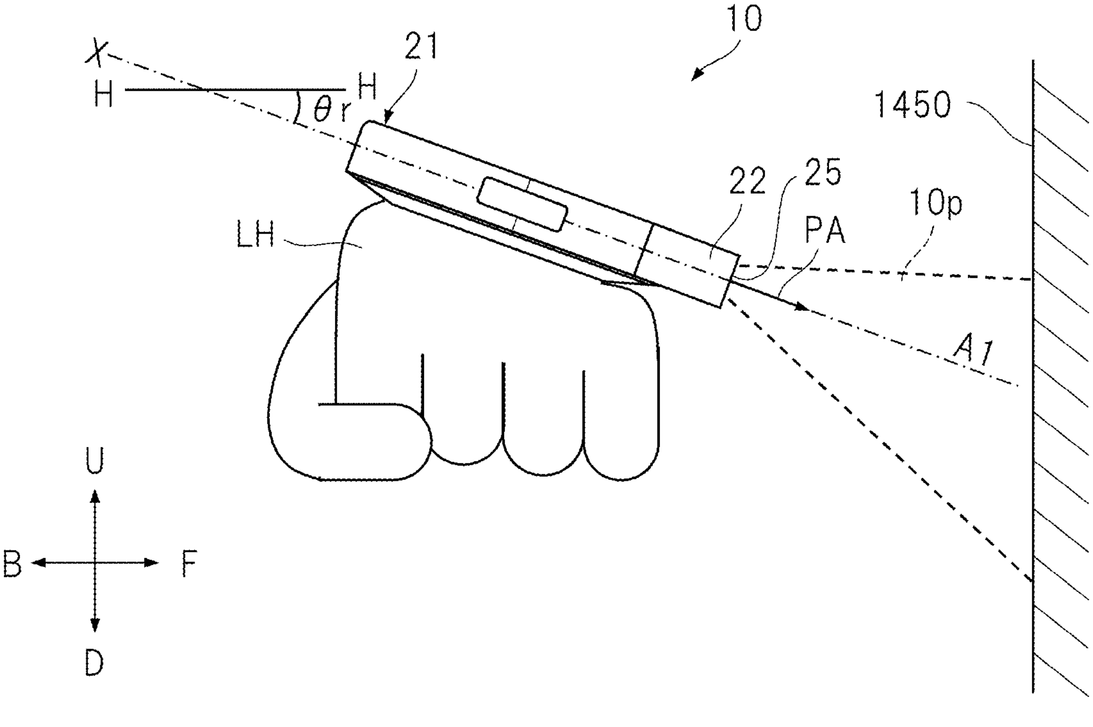

FIG. 20B A side view of the portable information terminal according to the sixth example.

Figure 21:
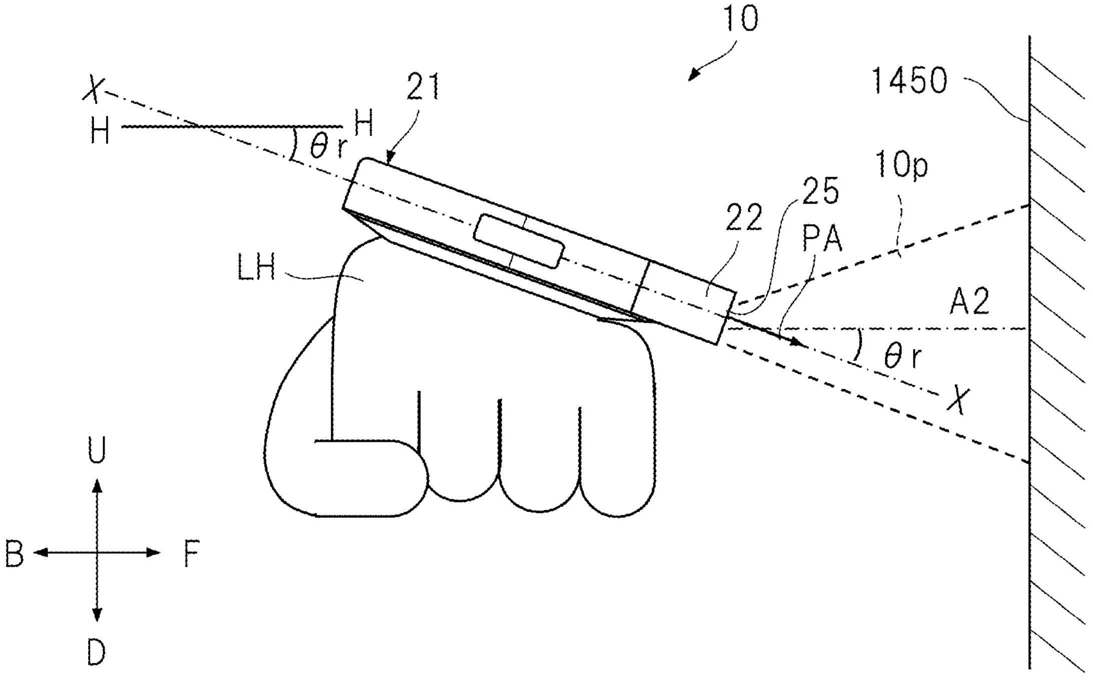

FIG. 21 A front view of the portable information terminal according to a seventh example.

Figure 22A:
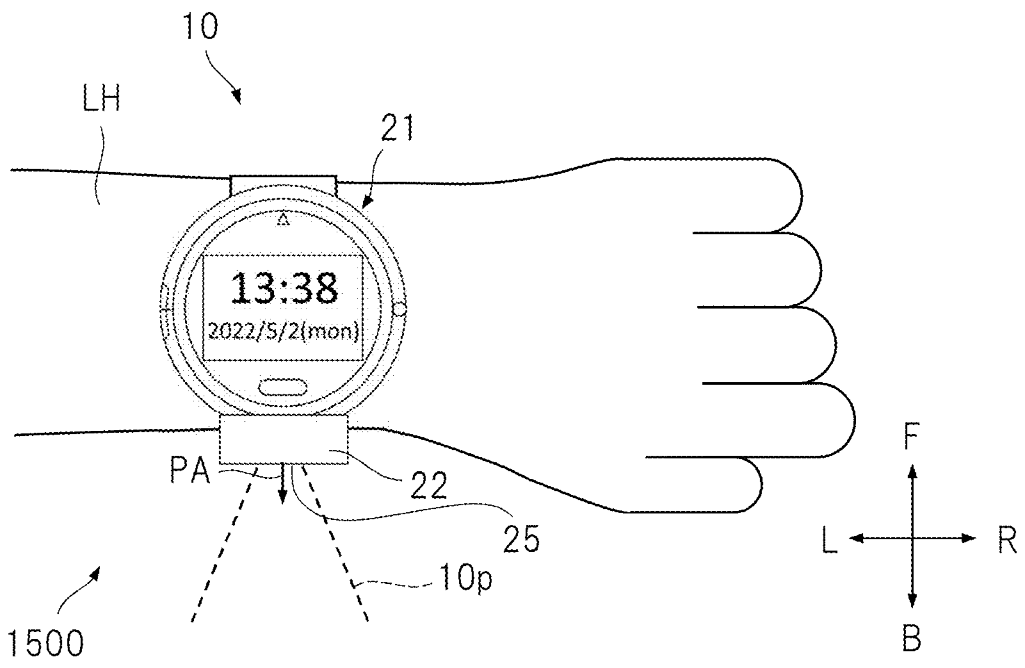

FIG. 22A A front view of the portable information terminal according to an eighth example.

Figure 22B:
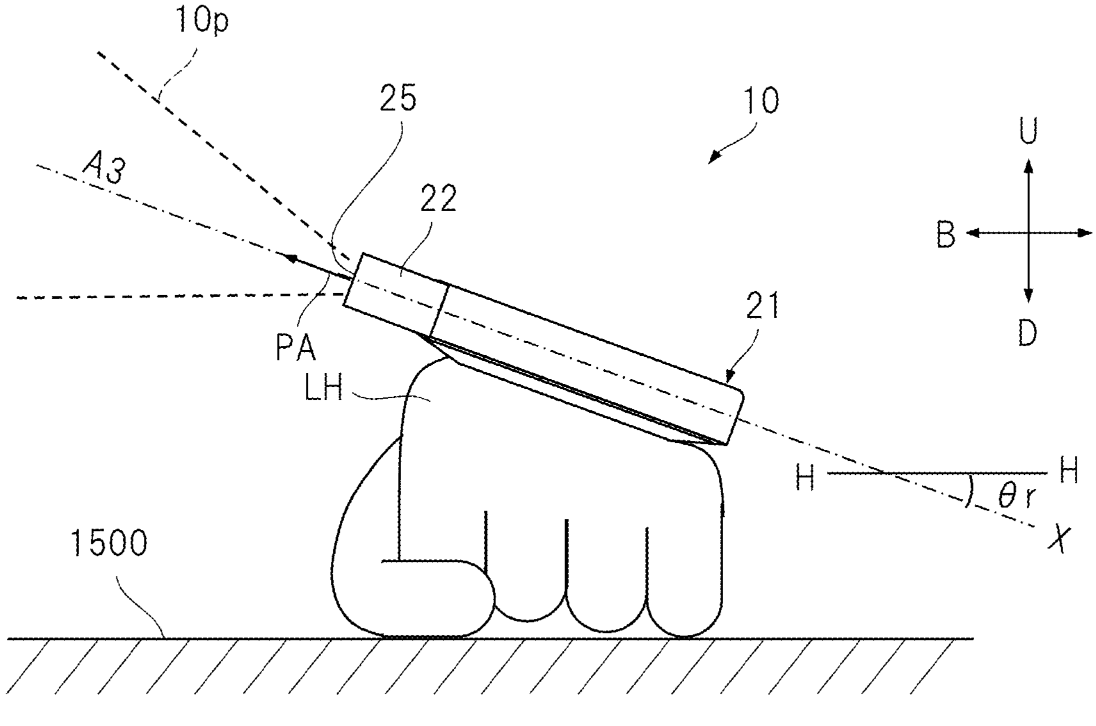

FIG. 22B A side view of the portable information terminal according to the eighth example.

Figure 23:
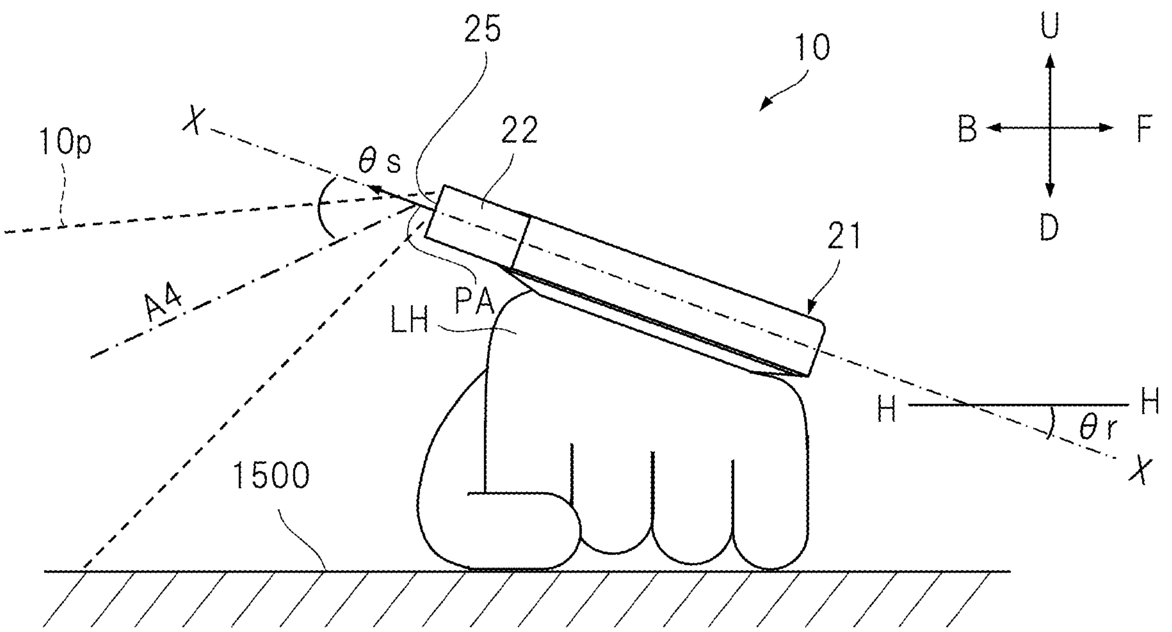

FIG. 23 A front view of the portable information terminal according to a ninth example.

FIG. 24 A drawing showing an example of a setting information table.

FIG. 25 A drawing showing an example of detailed contents of the setting information table.

FIG. 26 A drawing showing a table that shows examples of correspondence between attachment rotation positions and attachment rotation angles.

FIG. 27 A drawing showing a table that shows examples of correspondence between terminal body postures and tilt directions and upward tilt angles of the terminal body.

FIG. 28 A drawing showing an example of contents of setting information associated with a setting information table.

Figure 29:
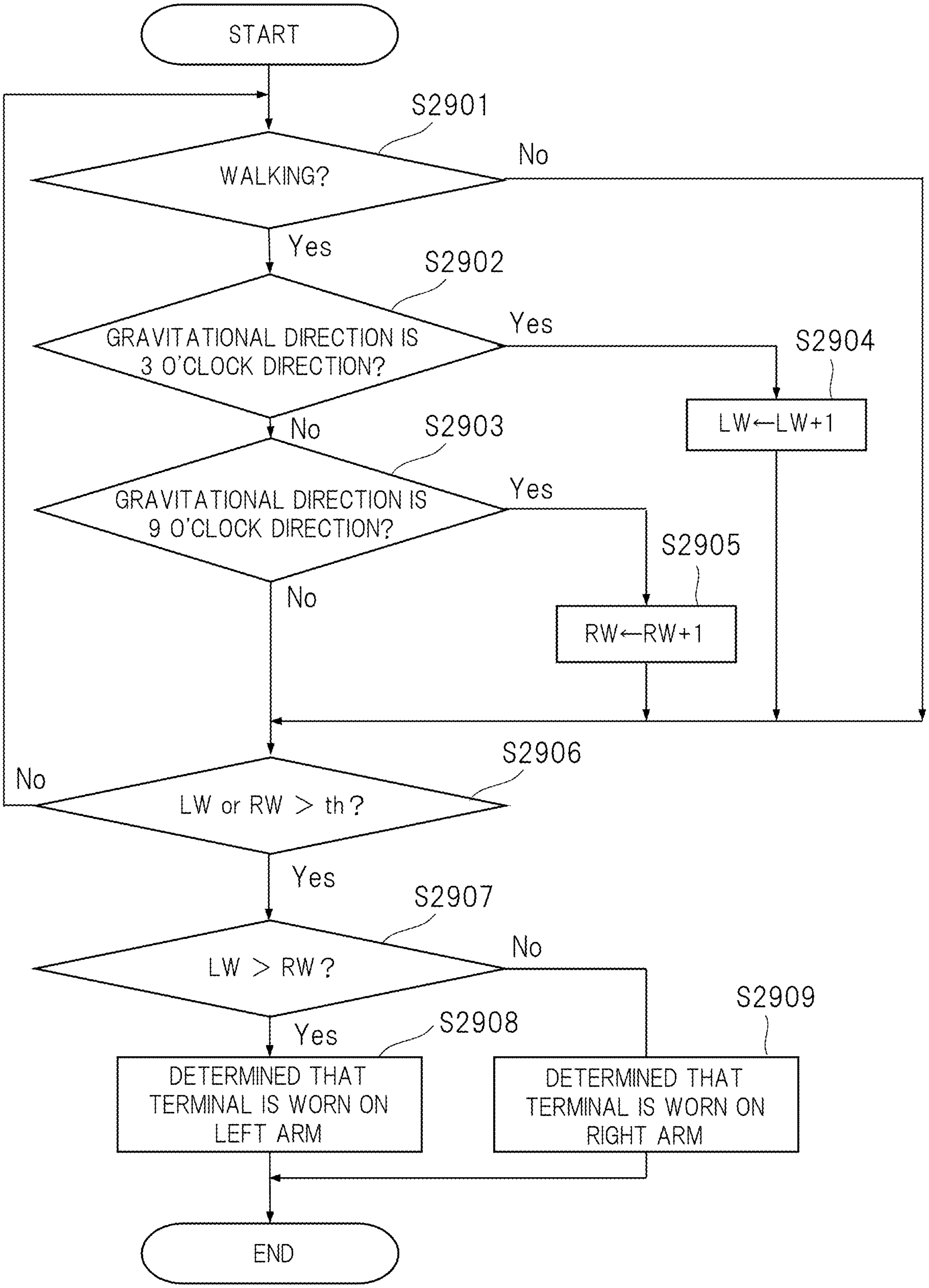

FIG. 29 A flow diagram showing an example of a process for automatically determining the left or right arm on which the portable information terminal is worn.

Figure 30:
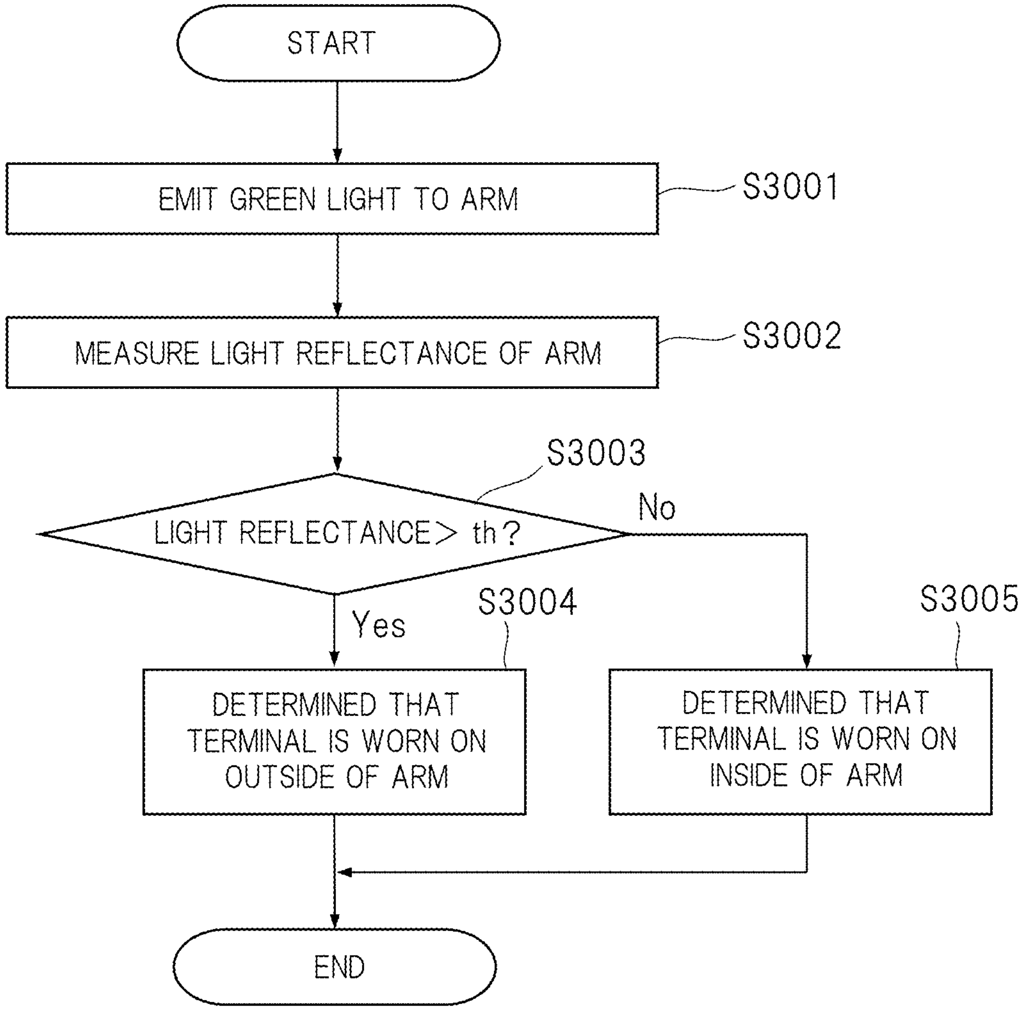

FIG. 30 A flow diagram showing an example of a process for determining the inside or outside of the arm on which the portable information terminal is worn.

Figure 31:
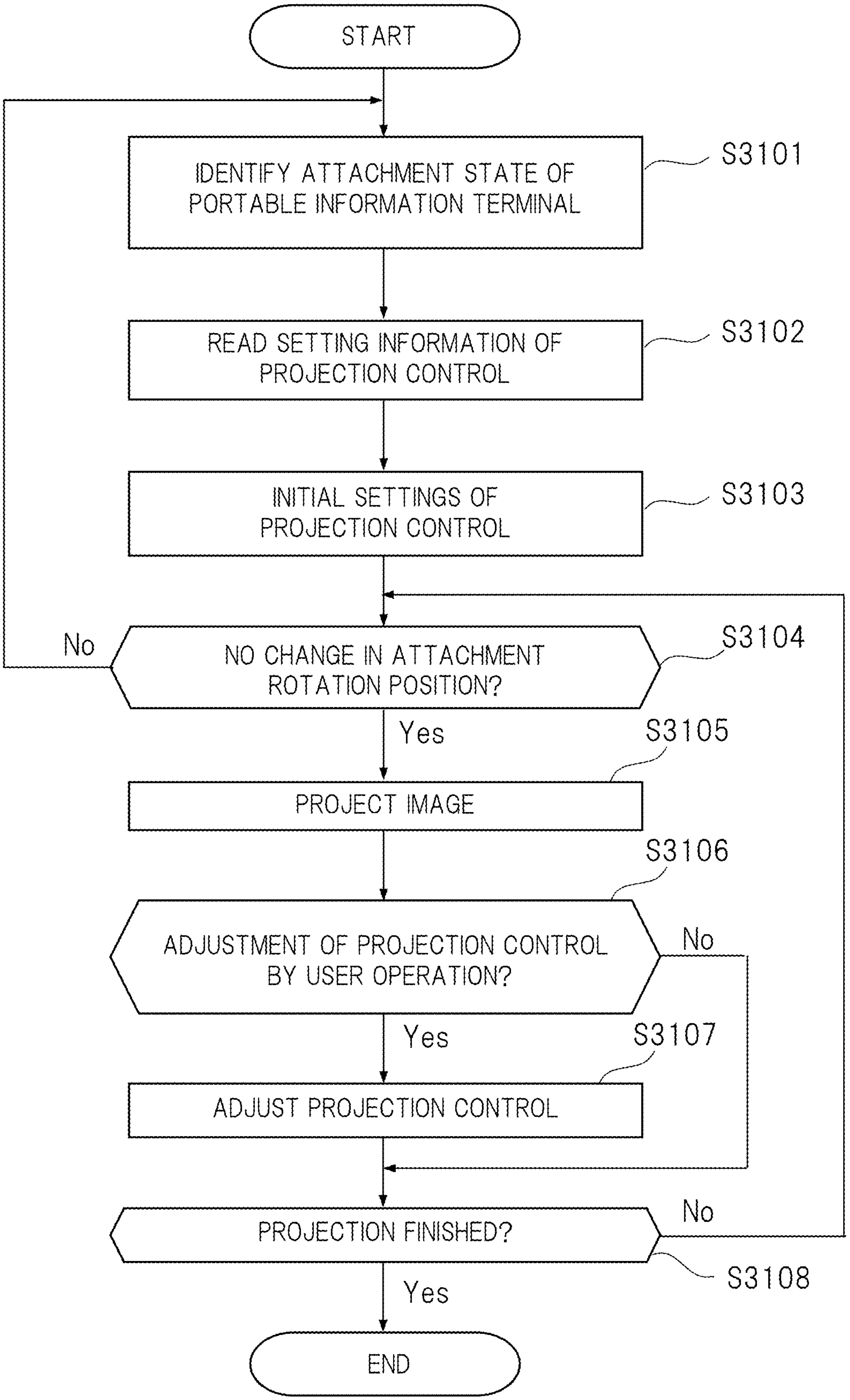

FIG. 31 A flow diagram showing an example of a process related to projection of display content for the portable information terminal.

Figure 32A:
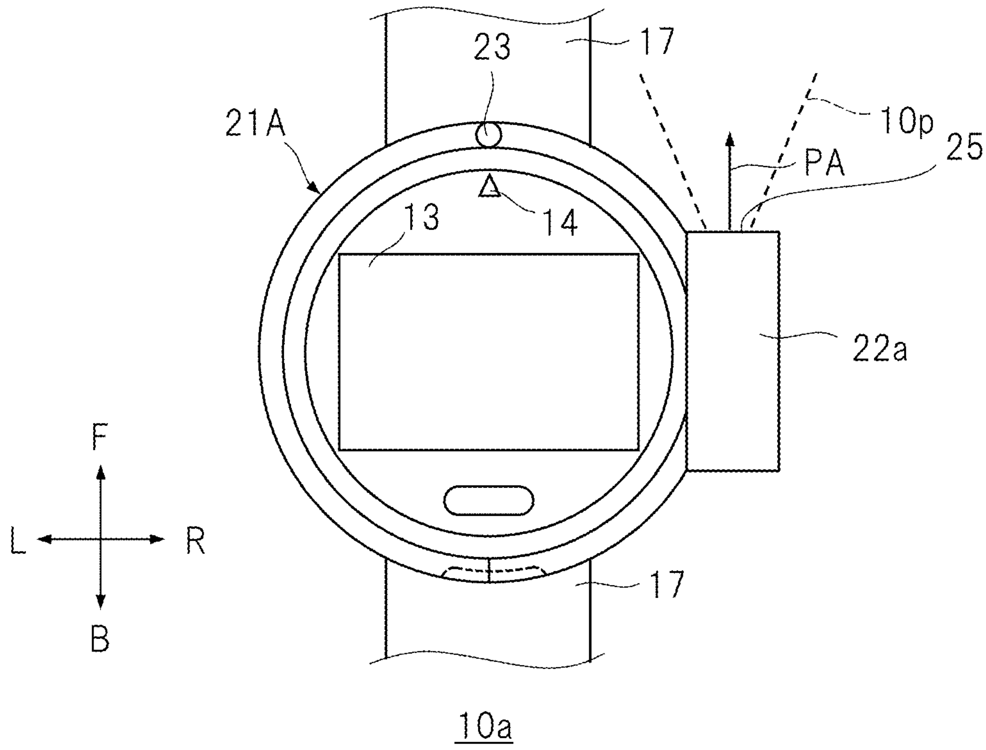

FIG. 32A A front view of the portable information terminal according to a first modified example of the first embodiment.

Figure 32B:
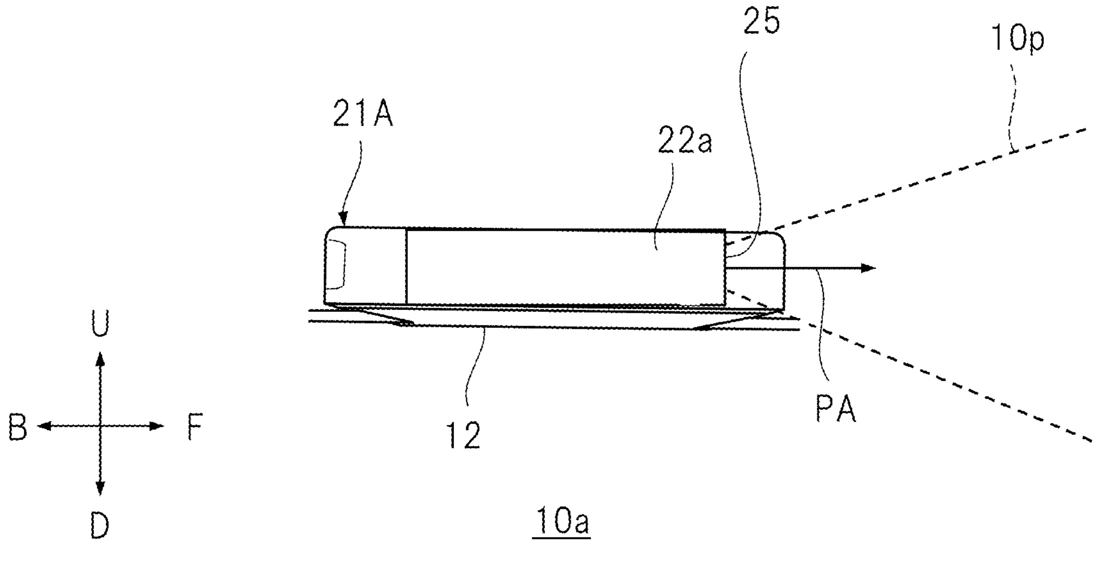

FIG. 32B A side view of the portable information terminal according to the first modified example of the first embodiment.

Figure 33:
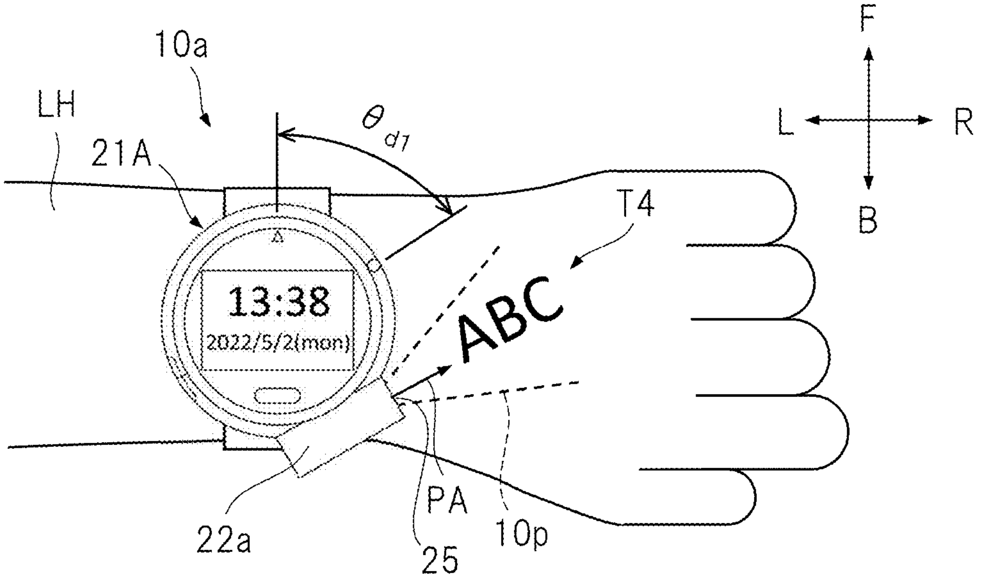

FIG. 33 A drawing showing an example of the portable information terminal according to the first modified example of the first embodiment.

Figure 34:
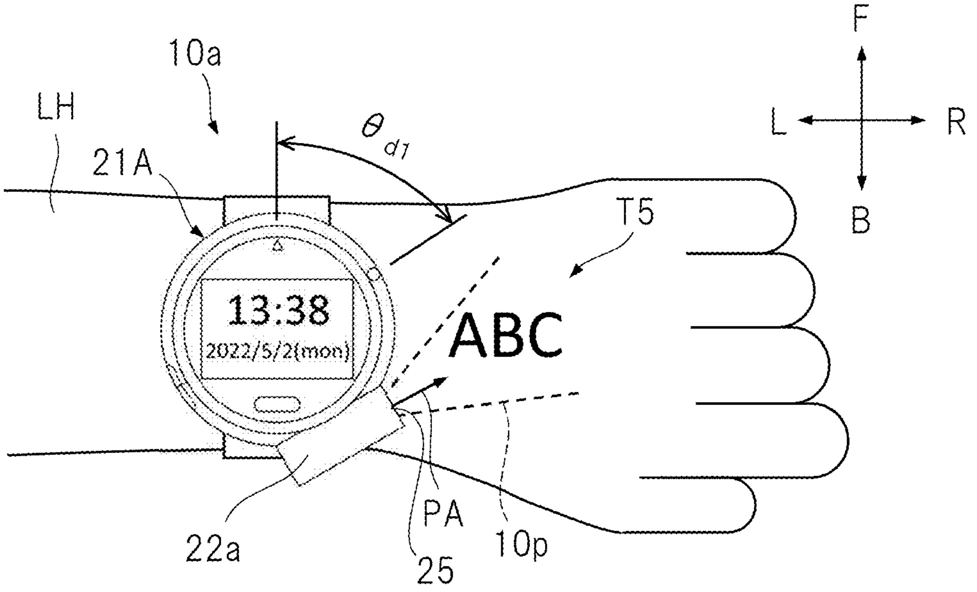

FIG. 34 A drawing showing a variation to the example of the portable information terminal shown in FIG. 33.

FIG. 35 A drawing showing an example of the setting information table.

FIG. 36 A drawing showing an example of detailed contents of the setting information table.

Figure 37A:
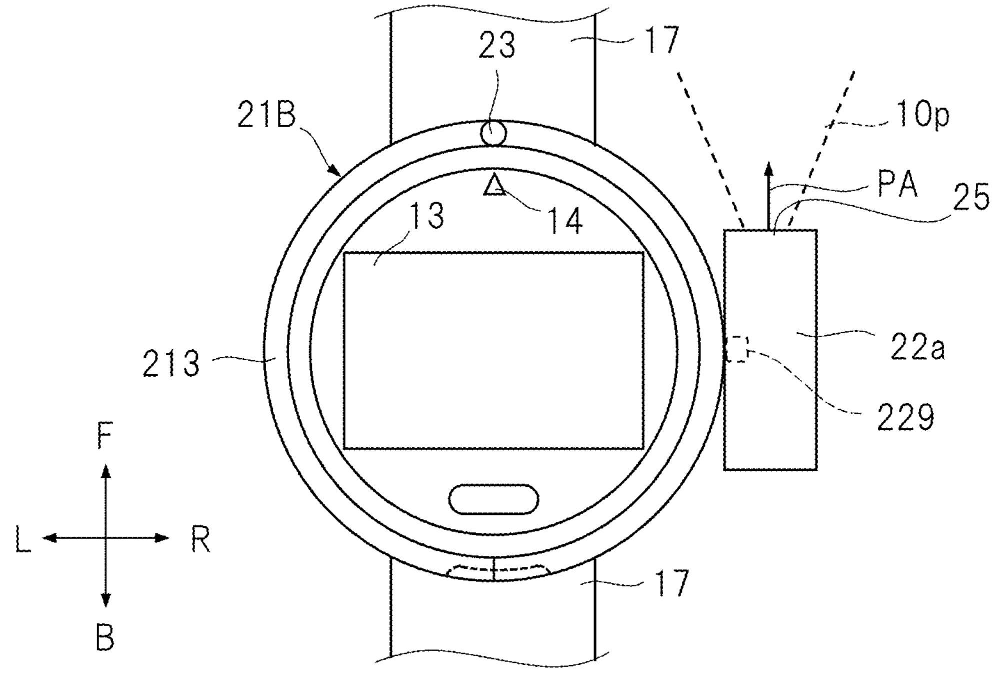

FIG. 37A front view of the portable information terminal according to a second modified example of the first embodiment.

Figure 37B:
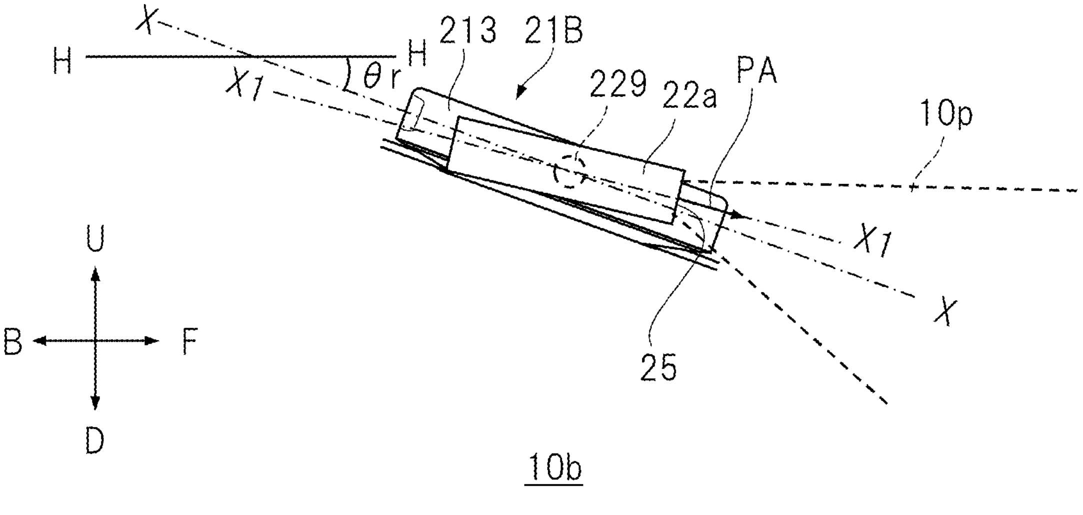

FIG. 37B A side view of the portable information terminal according to the second modified example of the first embodiment.

Figure 38:
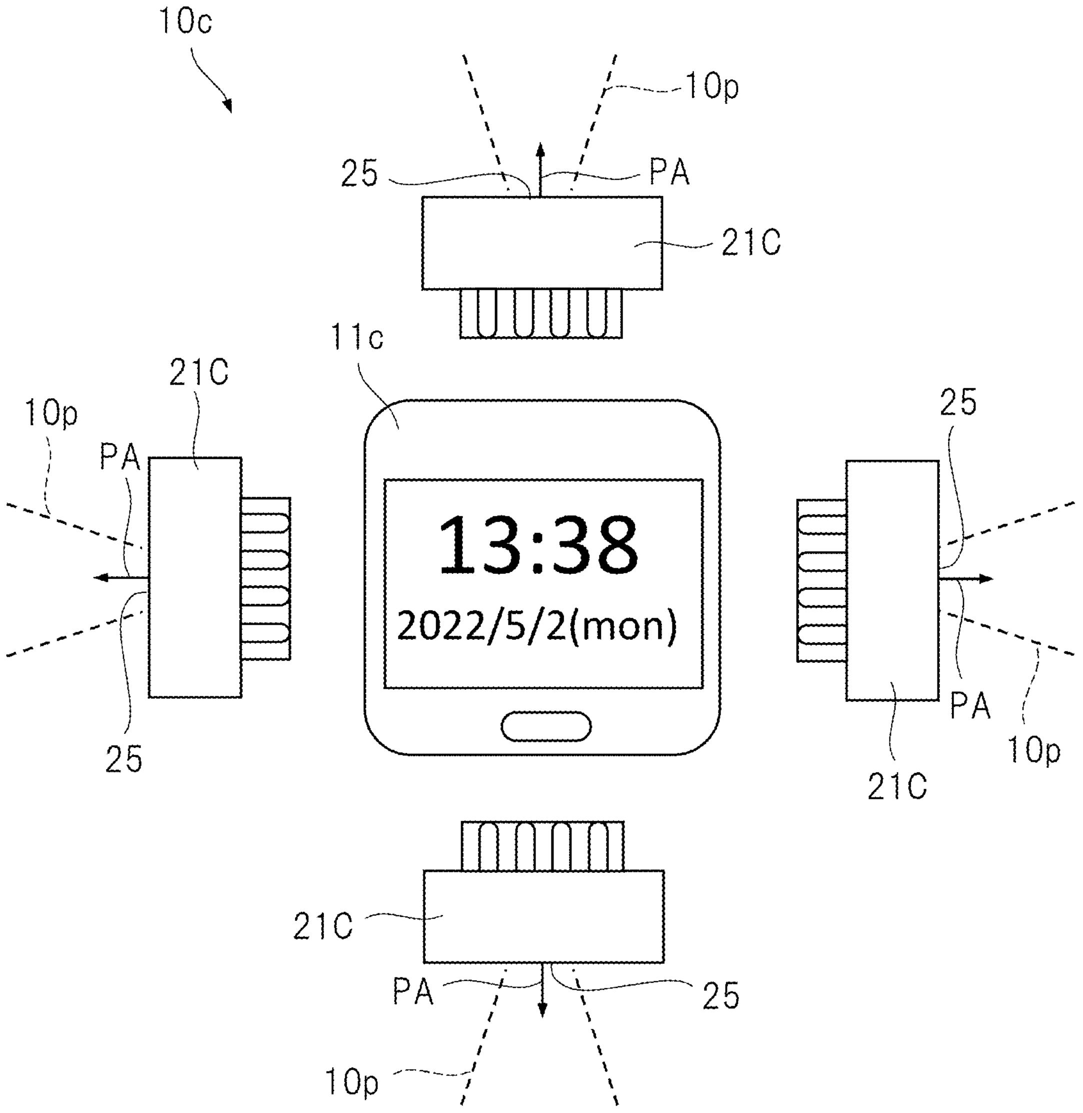

FIG. 38 A drawing showing a configuration example of the portable information terminal according to a second embodiment.

Figure 39:
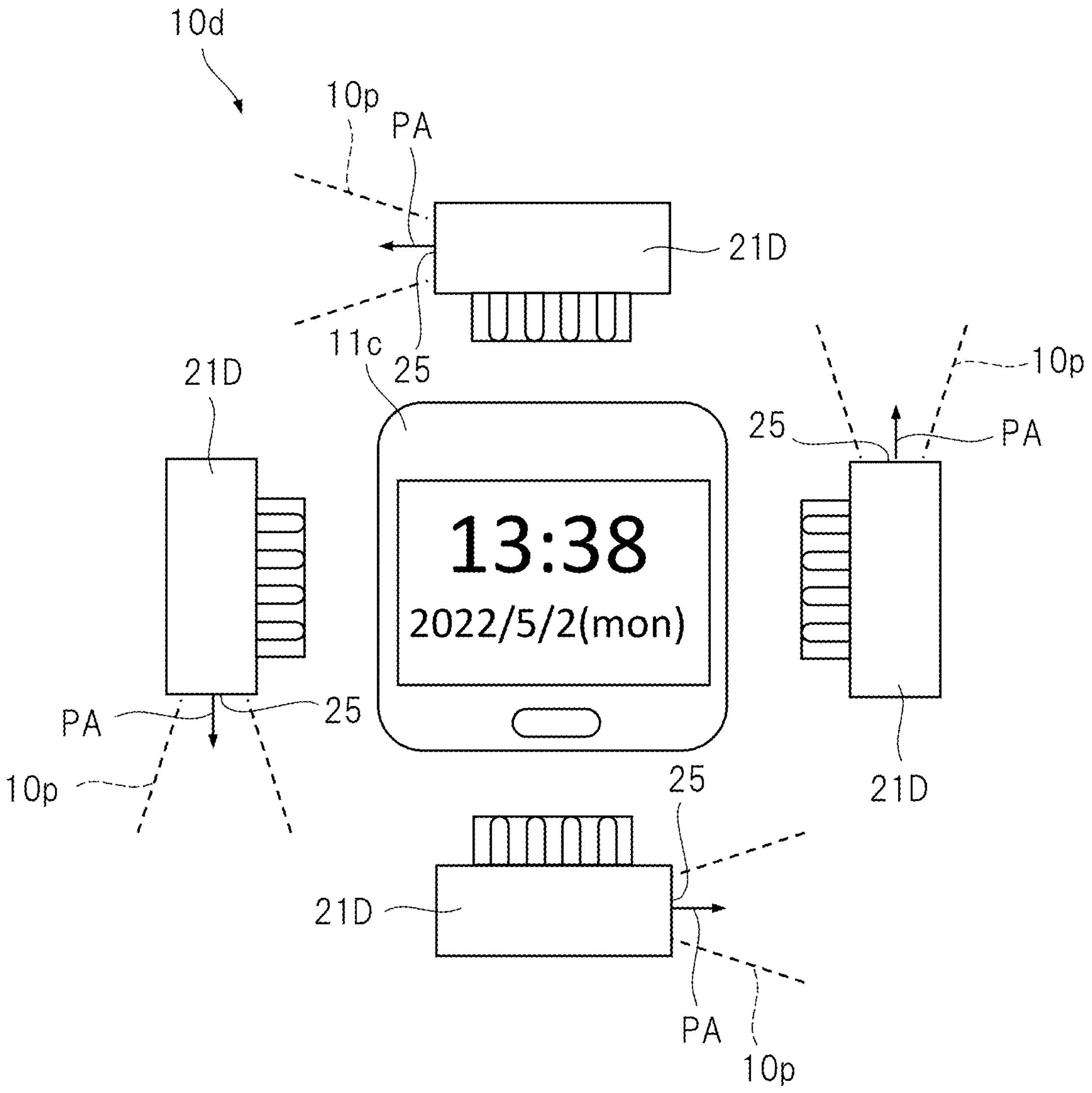

FIG. 39 A drawing showing the portable information terminal according to a first modified example of the second embodiment.

DETAILED DESCRIPTION OF PREFERRED EMBODIMENTS

Hereinafter, embodiments of the present invention will be described with reference to the drawings. Note that, in each of the embodiments and drawings, identical or equivalent components are denoted by the same reference signs, and redundant descriptions thereof are omitted unless otherwise specified.

First Embodiment

This section describes a portable information terminal according to a first embodiment. The portable information terminal according to the first embodiment has a function for projecting an image, video, and the like (hereinafter simply referred to as "image") which are pieces of display content. In addition, the portable information terminal according to the first embodiment is, for example, a so-called wristwatch type to be worn on an arm of a user. First, a configuration of the portable information terminal according to the first embodiment will be described.

<Configuration of the Portable Information Terminal>

FIG. 1A is a front view of the portable information terminal 10 according to the first embodiment. In addition, FIG. 1B is a side view of the portable information terminal 10 according to the first embodiment. Note that, in each of the embodiments described below and as shown in FIGS. 1A and 1B, when the display surface of the portable information terminal is viewed from the front, an upward direction is a forward direction F, a downward direction is a backward direction B, a rightward direction is a right direction R, a leftward direction is a left direction L, a proximal direction is an upper direction U, and a distal direction is a lower direction D.

As shown in FIGS. 1A and 1B, the portable information terminal 10 is mainly constituted by a terminal body 11 and an attachment 21.

The terminal body 11 has a circumferential periphery. In addition, the terminal body 11 has a housing 12, a touch screen 13, a marker 14, a belt 17, and a home button 191 as components.

The housing 12 corresponds to the so-called housing of the terminal body 11, and generally has a cylindrical shape with a short column axis length or a thick disk shape. The touch screen 13 is provided on a surface of the housing 12 and has, for example, a rectangular shape or a disk shape. The touch screen 13 has a structure in which a display and an input unit are integrated. The display displays time, biometric information, and other information, and is constituted by a liquid crystal panel, an organic EL, or other display elements. The input unit receives a touch operation by the user, and is constituted by a capacitive touch sensor or the like.

The marker 14 is arranged in a specific direction and position in the housing 12, and functions as a mark. In the present example, the marker 14 is a triangular mark, and is located at a twelve o'clock direction on a typical wristwatch. The belt 17 is connected to the housing 12, and is used to be wrapped around the user's arm such that the portable information terminal 10 is worn on the arm.

The home button 191 is a physical button provided on a display surface side of the touch screen 13 of the housing 12, and is separate from the touch screen 13. The home button 191 is used for, for example, returning from the screen displaying information to the screen showing the main menu.

The attachment 21 is configured to be removably attached to the circumferential periphery forming a side surface of the housing 12. In addition, in a case where the attachment 21 is attached to the periphery of the housing 12, the attachment is configured to be rotatable with respect to the housing 12. In addition, the attachment 21 is configured to be in communication with the terminal body 11.

The attachment 21 is mainly constituted by a bezel 213 and a projector 22.

The bezel 213 is configured to be attachable to the periphery of the housing 12. In addition, in a case where the bezel 213 is attached to the housing 12, the bezel 213 becomes an annular frame surrounding the display screen of the touch screen 13, and is configured to be rotatable with respect to the housing 12. The projector 22 is provided on the bezel 213 so as to be integral with the bezel 213.

The projector 22 has a function for projecting an image representing display content onto an object such as the back of a hand, a wall, a table, or the like. A projection opening 25 is formed in the projector 22, and a projection light 10*p* is projected from the projection opening 25 toward a projection opening direction PA which is a center axis direction of an opening of the projection opening 25. Details of a configuration of the attachment 21 will be described below.

FIG. 2 is a cross-sectional view of the portable information terminal shown in FIG. 1, taken along a line A-A. FIG. 2 shows a state where the attachment 21 is attached to the housing 12. Shaded areas in FIG. 2 represent cross sections of the attachment 21.

The portable information terminal 10 has a body information measurement sensor 16. The body information measurement sensor 16 is positioned such that it touches the skin when the user wears the portable information terminal 10 on the arm. The body information measurement sensor 16 has a function for measuring the user's pulse rate, electrocardiogram, blood flow, and the like, and outputs a signal according to the measurement result.

The housing 12 has a display surface side convex portion 12*a* and a sensor side convex portion 12*b*. The display surface side convex portion 12*a* is formed along a circumferential direction on the display surface side of the touch screen 13, and is a tapered convex portion. The sensor side convex portion 12*b* is formed along the circumferential direction on a side where the body information measurement sensor 16 of the housing 12 is arranged, and is a convex portion having a width d in a radial direction. Thus, forming an inner circumferential side of the bezel 213 to follow a circumferential shape of the housing 12 allows the portable information terminal 10 to be configured such that the bezel 213 cannot be removed from the housing 12.

The portable information terminal 10 has a control board 15 in the housing 12. The control board 15 controls a system of the portable information terminal 10, controls a display of the touch screen 13, and controls the image projected from the projector 22 of the bezel 213. In addition, the portable information terminal 10 has an internal space 22*i* inside a housing of the projector 22 provided on the bezel 213. The internal space 22*i* contains a control board 27 of the projector 22 described below or a projection optical system (not shown).

FIG. 3 is a front view of the terminal body 11 viewed from the display surface side. That is, FIG. 3 shows a state where the bezel 213 of the portable information terminal 10 is removed. As shown in FIG. 3, the housing 12 of the terminal body 11 is provided with pattern detection sensors 12*c* and 12*d*. The pattern detection sensors 12*c* and 12*d* irradiate light and detect a reflected light amount according to a pattern of a reflection surface of the irradiated light. Details of operations of the pattern detection sensors 12*c* and 12*d* will be described below.

FIG. 4 is a cross-sectional view of the terminal body 11 shown in FIG. 3, taken along a line B-B. As shown in FIG. 4, the housing 12 has a plurality of grooves formed along a circumferential side surface, and slip rings 18*a* to 18*d* are provided in these grooves. The bezel 213 is rotatably engaged with the slip rings 18*a* to 18*d*, and the bezel 213 and the slip rings 18*a* to 18*d* are configured to be electrically connected. Each of the slip rings 18*a* to 18*d* is electrically insulated from each other.

Here, as an example, the slip rings 18*a* and 18*d* are assigned as terminals that supply power from a power supply contained in the terminal body 11 to the bezel 213 side, and the slip rings 18*b* and 18*c* are assigned as terminals that send and receive signals with respect to the bezel 213 with differential binary signals.

As shown in FIG. 4, a housing side bezel backside contact surface 12*e* is formed on the sensor side convex portion 12*b*. The pattern detection sensors 12*c* and 12*d* are arranged on the housing side bezel backside contact surface 12*e*. The housing side bezel backside contact surface 12*e* has a width d in a radial direction of the bezel 213.

Hereinafter, a configuration of the attachment 21 will be described in detail with reference to the drawings.

FIG. 5 is a front view of the attachment 21. As shown in FIG. 5, the bezel 213 has a first semicircular part 211, a second semicircular part 212, a pin 23, and a clasp 24. The first semicircular part 211 and the second semicircular part 212 each have a generally semicircular shape, and a through hole is formed at one end of the circumferential direction. The pin 23 is inserted into the through hole of the first semicircular part 211 and the through hole of the second semicircular part 212 in an overlapped state, and connects the first semicircular part 211 and the second semicircular part 212 in an open-and-close manner with the pin 23 as a pivot point. The clasp 24 connects and secures the first semicircular part 211 and the second semicircular part 212 when the first semicircular part 211 and the second semicircular part 212 are in a closed state.

The projector 22 is provided near a center of an outer periphery of the second semicircular part 212 so as to not interfere with the terminal body 11, and is configured to be integral with the first semicircular part 211. The projector 22 is configured to project projection light such that display content such as an image or video representing a character, a drawing, an image, or the like is projected onto an object. The projection opening 25 is provided on a side surface of the projector 22, and is an optical opening through which the projection light 10*p* is projected. Therefore, the projector 22 integral with the bezel 213 is rotatable with the bezel 213, and a direction in which the projection light 10*p* from the projector 22 spreads can be freely changed within a 360-degree range.

With the first semicircular part 211 and the second semicircular part 212 connected by the clasp 24 in a closed state so as to surround the side surface of the housing, the bezel 213 is attached to the terminal body 11. Such a configuration allows the attachment 21 to be removably attached to the terminal body 11.

FIG. 6 is a cross-sectional view of the attachment 21 shown in FIG. 5, taken along a line C-C. A terminal body side bezel backside contact surface 21*b* in contact with the housing side bezel backside contact surface 12*e* (FIG. 4) when the bezel 213 is attached to the housing 12 is formed on a portion of a backside of the first semicircular part 211 and the second semicircular part 212, with the exception of a portion where the projector 22 is provided. The terminal body side bezel backside contact surface 21*b* has the width d in the radial direction of the bezel 213.

FIG. 7 is a cross-sectional view of the attachment 21 shown in FIG. 5, taken along a line D-D. Terminals 26*a* to 26*d* are provided on a portion of the first semicircular part 211 and the second semicircular part 212 where the projector 22 is provided. The terminals 26*a* to 26*d* each come in contact with and are electrically connected to the slip rings 18*a* to 18*d*, respectively, when the bezel 213 is attached to the housing 12. Such a configuration allows supply of power from the power supply in the housing to the bezel 213, and sending and receiving of signals between the housing 12 and the bezel 213. The power supplied to the bezel 213 is also supplied to the control board 27 and the like in the projector 22.

FIG. 8 is a rear view of the attachment 21. A rear surface of the bezel 213 is provided with a first light reflecting surface 213*a*, shown shaded, and a second light reflecting surface 213*b*, shown unshaded, on a surface of the terminal body side bezel backside contact surface 21*b* having the width d in the radial direction of the bezel 213 and along the circumferential portion of the bezel 213. The first light reflecting surface 213*a* and the second light reflecting surface 213*b* are alternately arranged at an angular interval of θp to form a pattern on the rear surface of the bezel 213. The first light reflecting surface 213*a* and the second light reflecting surface 213*b* have different light reflectance from each other. In the present example, the light reflectance is such that the second light reflecting surface 213*b* is greater than the first light reflecting surface 213*a*.

In FIG. 8, a position of the pattern detection sensor 12*c* when the attachment 21 is attached to the terminal body 11 (FIG. 3) is denoted as a position 12*c*', and a position of the pattern detection sensor 12*d* when the attachment 21 is attached to the terminal body 11 (FIG. 3) is denoted as a position 12*d*'.

FIG. 9 is a timing chart of output signals obtained by the pattern detection sensors. The timing chart shown in i FIG. 9 shows output signals obtained by the pattern detection sensor 12*c* and the pattern detection sensor 12*d* when the attachment 21 is rotated with respect to the terminal body 11. In the timing chart shown in FIG. 9, a horizontal axis represents elapsed time t. A detection signal of the pattern detection sensor 12*c* and a detection signal of the pattern detection sensor 12*d* output "H" (high level) where the reflectance in the second light reflecting surface 213*b* is relatively high, and output "L" where the reflectance in the first light reflecting surface 213*a* is relatively low.

Here, for example, the pattern detection sensor 12*c* and the pattern detection sensor 12*d* are arranged such that the angular interval between their positions is 2θp+θp/2 as described above when the bezel 213 is rotated at a constant speed in a rotation direction RF (FIG. 8). Therefore, as shown in FIG. 9, the output signal of the pattern detection sensor 12*c* has a pulse where the timing at which the level rises from "L" to "H" is earlier than the signal output of the pattern detection sensor 12*d*. As shown FIG. 9, when the bezel 213 is rotated at a constant speed in a rotation direction RB (FIG. 8), the output signal of the pattern detection sensor 12*c* has a pulse where the timing at which the level rises from "I" to "H" is slower than the signal output of the pattern detection sensor 12*d*.

Therefore, the rotation angle of the bezel 213 with respect to the terminal body 11 can be determined by the number of pulses of the outputs of the pattern detection sensor 12*c* and the pattern detection sensor 12*d*, that is, the number of times the H level and L level change. In addition, when the level of the signal output of the pattern detection sensor 12*c* at which the level of the signal output of the pattern detection sensor 12*d* rises from "L" to "H" is "H", the rotation direction of the bezel 213 can be determined to be the RF direction, and when the level of the signal output is "L", the rotation direction of the bezel 213 can be determined to be the RB direction.

Thus, the above-described configuration of the pattern of the terminal body side bezel backside contact surface 21*b* and the pattern detection sensors 12*c* and 12*d* allows a rotary encoder function to be realized.

Note that, although not shown, the terminal body 11 and the bezel 213 may be configured to provide a sense of operation in which the terminal body 11 and bezel 213 rotate with a click feeling while locked at a fixed angle, for example, at every pattern interval θp of the lowest detectable angle.

FIG. 10 is a rear view of the portable information terminal 10. As shown in FIG. 10, a rear surface of the terminal body 11 of the portable information terminal 10 is provided with a reset button 192 which is a pressable physical button. The reset button 192 is used to initialize measurement contents including rotation angle and rotation direction when the bezel 213 is attached to the terminal body 11, and is rotationally operated. When the reset button 192 is pressed, an initialization process is performed. Details of the initialization process will be described below.

<Internal Configuration and Function of Terminal Body>

FIG. 11 is a drawing showing an example of a hardware configuration of the terminal body 11. As shown in FIG. 11, the terminal body 11 has a communication interface (I/F) 113, a controller 114, the touch screen 13, a microphone 161, a speaker 162, an audio input/output unit 160, the home button 191, the reset button 192, a switch input unit 150, a storage 125, a mobile communication interface (I/F) 131, a memory 132, an acceleration sensor 133, a pulse counter 134, a GPS receiver 135, a gyro sensor 136, a geomagnetic sensor 137, the pattern detection sensor 12*c*, the pattern detection sensor 12*d*, the pulse counter 134, the switch input unit 150, the body information measurement sensor 16, a sensor interface (I/F) 139, an image output interface (I/F) 170, a battery 180, and the slip rings 18*a* to 18*d*. In addition, each functional portion excluding the home button 191, the reset button 192, the microphone 161, the speaker 162, the body information measurement sensor 16, the battery 180, and the slip rings 18*a* to 18*d* is connected via a bus 101.

The battery 180 is a power supply of the portable information terminal 10. The battery 180 supplies power to each component of the terminal body 11, and supplies power to the bezel 213 and the projector 22 via the slip rings 18*a* and 18*d*. The battery 180 is, for example, a secondary battery such as a rechargeable lithium-ion battery, and can be recharged by a charging circuit (not shown). In addition, the battery 180 supplies power to each component and the slip rings 18*a* and 18*d* via a power voltage conversion circuit (not shown) as necessary.

The storage 125 stores application programs. the controller 114 can extract an application program from the storage 125 to the memory 132 and execute the extracted application program to realize various functions.

Hereinafter, the various functions realized by the controller 114 executing the application program will be described as being primarily realized by the various program functions for the sake of clarity.

In addition, the application program may be stored in the storage 125 in advance before the terminal body 11 is shipped. Alternatively, the application program may be stored on optical media such as a CD (Compact Disk) or a DVD (Digital Versatile Disk) or a semiconductor memory, and may be installed from this media to the terminal body 11 via a media connection (not shown).

In addition, the application program may be downloaded from an external network (not shown) via the communication interface 113 and a wireless router (not shown), and may be installed in the terminal body 11. Alternatively, the application program may be downloaded from a distributor via the mobile communication interface 131 and a base station (not shown), and may be installed in the terminal body 11.

Further, it is also possible to connect a personal computer that has acquired the application program via a network and the terminal body 11 via an external device connection interface (not shown), and to move or copy the application program from this personal computer to the terminal body 11 for installation.

In addition, it is possible to realize the application program in hardware as a processor with similar functions. In a case where it is realized as hardware, each processor mainly realizes each function.

The communication interface 113 is connected to a wireless router (not shown) via a wireless LAN (Local Area Network) or the like. In addition, the communication interface 113 is connected to an external network via the wireless router to send and receive information with respect to a server and the like of the external network.

In addition to or instead of a communication function with the wireless router, it is possible for the communication interface 113 to directly communicate with the server without a wireless router using technologies such as Wi-Fi (registered trademark) and other wireless LANs.

The communication interface 113 may be implemented with a plurality of chips that handle communication methods that differ from each other. In addition, the communication interface 113 may be implemented with a single chip that handles a plurality of communication methods that differ from each other. The communication interface 113 may be able to communicate with other devices using a communication method called BLUETOOTH (registered trademark) for proximity communication.

The mobile communication interface 131 utilizes a mobile communication network such as LTE (Long Term Evolution), 4G, or 5G communication to connect to a communication network through a base station. The mobile communication interface 131 can send and receive information to and from a server of the communication network and can also share each other's position among terminals. Note that communication methods are not limited to the above-described examples.

In addition, the portable information terminal 10 may be configured such that connection to an external network by the communication interface 113 can be prioritized over communication network connection by the mobile communication interface 131.

The controller 114 receives a user operation request from the home button 191 or the reset button 192 via the switch input unit 150 or from the microphone 161 via the audio input/output unit 160. The controller 114 controls the touch screen 13, the communication interface 113, and various program functions according to the received operation request.

Further, the controller 114 can acquire various information from the server on the external network via the communication interface 113 and the wireless router, or via the mobile communication interface 131 and the base station. The controller 114 also has the function of passing the acquired various information to the various program functions. The user can use these functions to exchange image and sound with a communication partner to conduct voice chatting and the like.

The storage 125 is controlled by an instruction from the controller 114, and can store application programs. In addition, the storage 125 stores various information created by the application program.

The storage 125 may store content such as video and audio streams based on a signal received from the communication interface 113 or the mobile communication interface 131. The storage 125 may be built into the portable information terminal 10, or may be a memory mounted in a portable bezel 213 that can be removably attached to the terminal body 11 of the portable information terminal 10.

The memory 132 is controlled by an instruction from the controller 114. The functions of the application program stored in the storage 125 are sent to the memory 132 by the controller 114.

A display 13*b* configuring the touch screen 13 displays the image or video stored in the storage 125, a broadcast program or distributed video, a user interface (UI) for various operations, and the image generated by the application program. Note that the display 13*b* may also display an image or video received from the server on the external network via the communication interface 113.

In addition, the display 13*b* may display an image or video received from a TV receiver via the communication interface 113, or an image or video distributed from the server on the communication network via the mobile communication interface 131.

The home button 191 and the reset button 192 receive a user operation on the terminal body 11 of the portable information terminal 10 from the user, and are input units where control information regarding an input operation is input.

A drag operation is, for example, an operation for moving any object such as a displayed icon on the display screen of the touch screen 13 by touching it with a finger. A flick operation is an operation for moving an object on the display screen of the touch screen 13 by flicking with a finger.

A tap operation or a double-tap operation can be used to activate an object such as an icon or to switch to another screen. The tap operation is an operation in which an object or the like is tapped once with a finger. The double-tap operation is an operation in which an object or the like is tapped twice with a finger. Here, each of the above-described operations on the touch screen 13 is referred to as a drag operation, a flick operation, and a tap operation.

The acceleration sensor 133 measures acceleration applied to the portable information terminal 10. The geomagnetic sensor 137 measures the geomagnetic field at a position where the portable information terminal 10 is present.

The pulse counter 134 counts the pulses (FIG. 9) obtained by the pattern detection sensors 12*c* and 12*d* when the attachment 21 attached to the terminal body 11 is rotationally operated by the user. The controller 114 detects the rotation direction of the attachment 21 based on the signal of the pulses. The controller 114 can obtain the rotation operation angle of the attachment 21 based on the detected rotation direction and the counted pulses.

In addition, the controller 114 can detect, for example, which portion of the terminal body 11 is upward, that is, a tilt, posture, or the like of the terminal body 11, by measuring the gravitational acceleration with the acceleration sensor 133. Further, the controller 114 can determine whether the terminal body 11 is worn on the right arm or the left arm based on the detected tilt, posture, or the like of the terminal body 11. In addition, the controller 114 can correct distortion of the image based on the detected tilt, posture, or the like of the terminal body 11 by controlling a shape of the image projected from the projector 22 integrally provided with the bezel unit 213 attached to the terminal body 11. Details of the correction will be described below.

The geomagnetic sensor 137 measures the geomagnetic field by, for example, utilizing a plurality of magnetic sensors. The GPS receiver 135 receives signals sent from a plurality of satellites using GPS (Global Positioning System). The controller 114 can calculate positional information of the terminal body 11 of the portable information terminal 10 based on the signals received by the GPS receiver 135.

The gyro sensor 136 measures an angular velocity of the terminal body 11 that occurs when, for example, the user moves the terminal body 11.

The body information measurement sensor 16 is generally configured to irradiate green light onto the user's arm and output a signal according to the reflected light amount to measure, for example, the user's heart rate, blood flow, and the like. However, the measurement target, measurement method, and configuration of the body information measurement sensor 16 are not limited to the above. The sensor interface 139 converts the output of the body information measurement sensor 16 into a digital value. The controller 114 causes an application program to process the converted digital value to obtain the heart rate, blood flow, or the like, and displays the heart rate, blood flow rate, or the like on the display 13*b*.

The audio input/output unit 160 inputs and outputs an audio input signals from the microphone 161 equipped in the portable information terminal 10 and an audio output signal to the speaker 162. The controller 114 controls a volume of its audio input and output.

The switch input unit 150 takes switch information according to operations of the home button 191 and the reset button 192, and sends it to the controller 114 through the bus 101. The controller 114 causes the switch information to be used to control various application programs as necessary.

When the home button 191 is pressed, the controller 114 controls each unit such that the inside of the terminal body 11 enters an initial state and the display screen returns to the initial screen in an operation system, regardless of the operating state of the running application program. Details of the operation of the terminal body 11 when the reset button 192 is pressed will be described below.

The image output interface 170 outputs the displayed image generated by the controller 114 to the outside and exchanges information related to the initialization process when the bezel 213 is connected to the terminal body 11 via the slip rings 18*b* and 18*c*. Note that, in the present embodiment, the displayed image is an image to be projected and displayed by the projector 22 provided in the removably attached and replaceable bezel 213.

<Internal Configuration and Function of Bezel>

FIG. 12 is a drawing showing an example of a configuration of the projector 22 in the attachment 21. As shown in FIG. 12, the projector 22 has the terminals 26*a* to 26*d*, an image input interface (I/F) 203, a controller 204, a nonvolatile memory 205, a memory 206, a display element driver 207, a projection optical system 208, a display element 209, an illumination optical system 210, and a light source 215. In addition, each functional portion of the image input interface 203, the controller 204, the nonvolatile memory 205, the memory 206, and the display element driver 207 is connected via a bus 201.

The power supplied from the terminal body 11 via the terminals 26*a* and 26*d* is supplied to each component via the power voltage conversion circuit (not shown).

The light source 215 generates light that is the source of the projection light 10*p* used for projecting an image, video, or the like, and uses an LED light source, a laser light source, or the like. The illumination optical system 210 focuses the light generated by the light source 215, and makes it more uniform to irradiate it to the display element 209.

The display element 209 is an element that transmits or reflects the light from the illumination optical system 210 and modulates the light to generate video. The display element 209 is, for example, a transmissive liquid crystal panel, a reflective liquid crystal panel, or a DMD (Digital Micromirror Device: registered trademark) panel. The display element driver 207 sends a drive signal to the display element 209 according to a video signal. The projection optical system 208 is an expansion projection optical system that projects an image, video, or the like onto an object, and includes at least one of a lens and a mirror.

Here, the video signal referenced by the display element driver 207 is the video signal input from the terminal body 11 of the portable information terminal 10, and is input as a differential binary signal from the terminals 26*b* and 26*c*. Note that the video signal referenced by the display element driver 207 may be a signal obtained by superimposing an OSD (On Screen Display) image signal generated by the controller 204 using an image stored in the nonvolatile memory 205 on the video signal obtained via the image input interface 203. The display element 209 modulates the light and generates an optical image according to a drive signal generated by the display element driver 207 with reference to the video signal. The generated optical image is projected by the projection optical system 208 as a displayed video with a spread of the projection light 10*p*.

Note that a protocol for the signal being communicated between the slip rings 18*b* and 18*c* provided on the terminal body 11 of the portable information terminal 10 and the terminals 26*b* and 26*c* on the bezel 213 is not particularly limited. However, using an existing protocol such as USB (Universal Serial Bus) allows usage of a conventional communication software or the like, thereby suppressing cost of product development of the portable information terminal. As a result, portable information terminal products can be offered to users at a lower cost.

<Initialization Process When Attachment is Attached>

The portable information terminal 10 has an initialization process function for when the attachment is attached. The initialization process function for when the attachment is attached is a process in which, when the attachment 21 is attached to the terminal body 11 of the portable information terminal 10, the controller 114 on the terminal body 11 side (FIG. 11) detects attachment of the attachment and performs initialization to enable the function of the attachment.

FIG. 13 is a flow diagram showing the initialization process when the attachment is attached.

In step S1301, attachment detection of the attachment is performed. Specifically, when the user attaches the attachment 21 to the terminal body 11, the controller 114 detects the attachment of the attachment by a process similar to, for example, a USB plug-in process. Then, communication of a signal representing information related to a function which the attachment 21 has is performed between the controller 114 and the attachment 21. Performing such a communication process is effective in increasing the number of variations of attachments. For example, the attachment 21 can be provided with functions other than the projector function, such as those with a camera function.

In step S1302, determination is performed as to whether or not the attachment has a projector function. Specifically, the controller 114 determines whether or not the attachment 21 has the projector function based on information received from the attached attachment 21. In this determination, if it is determined that the attachment 21 has the projector function (S1302: Yes), the controller 114 causes a processing step to be executed to proceed to step S1303. On the other hand, if it is determined that the attachment 21 does not have the projector function (S1302: No), the controller 114 causes the processing step to be executed to shift to step S1306.

In step S1303, message display is performed. Specifically, the controller 114 controls the display 13*b* to display a message for the attachment having the projector function. The message to be displayed is, for example, a message to urge the user to align a portion of the pin 23 of the attachment 21 with the marker 14 and press the reset button 192 (FIG. 10).

FIG. 14 is a drawing showing an example of a displayed message. For example, as shown in FIG. 14, the controller 114 causes a message such as "ALIGN PIN OF BEZEL WITH Δ AND PRESS RESET BUTTON ON BACK SIDE" to be displayed on the display screen of the display 13*b*.

In step S1304, determination is performed as to whether or not the reset button has been pressed. Specifically, the controller 114 determines whether or not the reset button 192 has been pressed. In this determination, if it is determined that the reset button 192 has been pressed (S1304: Yes), the controller 114 causes the processing step to be executed to shift to the next step S1305. On the other hand, if it is determined that the reset button 192 has not been pressed (S1304: No), the processing step to be executed returns to step S1304. By such processing, the system is placed in a waiting state until the reset button 192 is pressed.

In step S1305, resetting of the pulse counter 134 i performed. Specifically, the controller 114 resets the pulse counter 134 (FIG. 11) and sets the count of pulses counted by the pulse counter 134 to zero. Once this setting is completed, the initialization process is finished.

In step S1306, other initialization processes for the attachment not having a projector are performed. Specifically, the controller 114 performs initialization processing corresponding to functions of the attached attachment 21. After the processing, the initialization process is finished.

After the initialization process is performed in a case where the attachment having the projector function is attached to the terminal body 11 in this manner, the controller 114 reads the count of pulses from the pulse counter 134 in almost real time. Based on the counts read, the controller 114 detects the rotation angle position (hereinafter referred to as the attachment rotation position) of the bezel 213, that is, the attachment 21, with respect to the terminal body 11.

Note that the reset button 192 may be used with other buttons such as the home button 191.

<Image Projection Control by the Controller>

This section describes projection control of the image by the controller 114 on the terminal body 11 side. The controller 114 has a function to perform a correction related to projecting the image such that image suitable for viewing is projected according to an attachment state of the portable information terminal 10. Projection control of the image mainly includes an image rotation control, an image shape control, and an image projection angle control. Hereinafter, each of these controls will be described.

<<Image Rotation Control>>

The portable information terminal 10 has a function of the image rotation control. The image rotation control is one of the projection controls performed to maintain a vertical relationship of the image even when the attachment rotation position changes, in order to improve visibility of the projected image when projecting the image which is display content. The controller 114 (FIG. 11) on the terminal body 11 side identifies the attachment state of the portable information terminal, and, according to the identified attachment state, performs rotation control of the image suitable for that attachment state.

FIG. 15A is a front view of the portable information terminal 10 according to a first example. FIG. 15B is a side view of the portable information terminal 10 according to the first example. In addition, FIG. 16A is a front view of the portable information terminal 10 according to a second example. FIG. 16B is a side view of the portable information terminal 10 according to the second example. In the examples shown in FIGS. 15A, 15B, 16A, and 16B, the portable information terminal 10 is worn on an outside of the left arm of the user where an image representing characters "ABC"is projected.

In the first example shown in FIGS. 15A and 15B, an orientation of the projection opening 25 of the projector 22, that is, the projection opening direction PA, is set to the three o'clock direction, and an image T1 is projected onto a back of the left hand.

In the second example shown in FIGS. 16A and 16B, the projection opening direction PA is set to the twelve o'clock direction by the rotation operation of the attachment 21, and an image T2 is projected onto a table 1500 on which the left hand of the user is placed. At this time, the controller 114 detects the rotation angle position and tilt angle of the attachment 21. The controller 114 then corrects the orientation and spread of the projection light corresponding to the image representing the characters "ABC" according to the detected rotation angle position and tilt angle of the attachment 21. This correction is performed such that the characters "ABC" represented by the projected image appear to remain horizontal as viewed by the user. Such correction is mainly performed by the image rotation control of the display content, and is effective in improving visibility of the projected image.

FIG. 17A is a front view of the portable information terminal 10 according to a third example. FIG. 17B is a side view of the portable information terminal 10 according to the third example. In the third example shown in FIGS. 17A and 17B, the portable information terminal 10 is worn on the user's right arm RH, and the image representing the characters "ABC" is projected on a back of the right hand. In the first example shown in FIG. 15A, the portable information terminal 10 is worn on the left arm LH, whereas in the third example shown in FIG. 17A, the portable information terminal 10 is worn on the right arm RH. Therefore, in the third example, the attachment 21 or the bezel 213 itself is rotated by 180 degrees, unlike the first example shown in FIG. 15A. Therefore, the image representing the characters "ABC" needs to be displayed squarely as shown in FIG. 17A to allow easier viewing for the user.

In a case where the portable information terminal 10 is worn on the right arm RH, the controller 114 corrects the projected image, that is, the projection light, based on the attachment rotation position to allow easier viewing of the image for the user. Such correction is mainly performed by the image rotation control of the display content, and is effective in improving visibility of the projected image.

<<Image Shape Control>>

The portable information terminal 10 has a function of the image shape control. The image shape control is one of the projection controls performed to improve visibility of the projected image when projecting the image which is display content. The controller 114 (FIG. 11) on the terminal body 11 side identifies the attachment state of the portable information terminal, and, according to the identified attachment state, performs shape control of the image suitable for that attachment state.

FIG. 18A is a front view of the portable information terminal 10 according to a fourth example. FIG. 18B is a side view of the portable information terminal 10 according to the fourth example. In addition, FIG. 19 is a front view of the portable information terminal 10 according to a fifth example. In the examples shown in FIGS. 18A, 18B, and 19, the portable information terminal 10 is worn on the outside of the left arm where an image representing a square is projected.

In the fourth example shown in FIGS. 18A and 18B, the attachment 21 is rotated, an orientation of a center axis of the projection opening 25 the projector 22, that is, the projection opening direction PA, is set to the twelve o'clock direction, and an image S1 is projected onto the table 1500 on which the user's left arm LH is placed. In addition, in the fourth example, the portable information terminal 10 is naturally lifted and tilted on the front side due to the structure and shape of the human skeleton, joints, or arms. In the fourth example, a center line of the portable information terminal 10, that is, the front-back direction X, is tilted at a tilt angle θr with respect to a horizontal direction H. In addition, in the fourth example, there is shown a state where the image correction based on the presence of the tilt angle when the image is projected onto the table 1500 on which the user's left arm LH is placed is not performed. In this state of not performing the image correction based on the tilt angle of the portable information terminal 10, the square represented by the image S1 is distorted into a trapezoidal shape due to the presence of the tilt angle θr from the horizontal direction H.

In contrast, in the fifth example shown in FIG. 19, the controller 114 detects the attachment rotation position and the tilt angle of the terminal body 11, and corrects the orientation and spread of the projection light corresponding to the image representing the square according to the detected rotation angle and tilt angle. As shown in FIG. 19, this correction is performed such that the square represented by the projected image S2 appears to maintain its square shape as viewed by the user. Such correction is mainly performed by the image shape control of the display content, and is effective in improving visibility of the projected image, as distortion of the image is reduced.

<<Image Projection Angle Control>>

The portable information terminal 10 has a function of the image projection angle control. The image projection angle control is one of the projection controls performed to improve visibility of the projected image when projecting the image which is display content. The controller 114 (FIG. 11) on the terminal body 11 side identifies the attachment state of the portable information terminal, and, according to the identified attachment state, performs projection angle control of the image suitable for that attachment state.

FIG. 20A is a front view of the portable information terminal 10 according to a sixth example. FIG. 20B is a side view of the portable information terminal 10 according to the sixth example. In addition, FIG. 21 is a front view of the portable information terminal 10 according to a seventh example. In the examples shown in FIGS. 20A, 20B, and 21, the portable information terminal 10 is worn on the outside of the left arm of the user, and the image is projected with the projection opening 25 directed toward a front wall 1450.

In the sixth example shown in FIGS. 20A and 20B, the attachment 21 is rotated, the projector 22 is directed toward the twelve o'clock direction, and the image is projected onto the wall in front of the user. When the user assumes a posture such that the front-back direction of the portable information terminal 10 worn on the arm is aligned with the front-back direction of the user, the arm is often lifted and tilted due to the structure and shape of the human skeleton, joints, or arms. In the sixth example, the front-back direction X of the portable information terminal 10 is tilted at a tilt angle θr with respect to the horizontal direction H, and an optical axis of the projection light 10*p* is an optical axis A1 parallel to the front-back direction X. In addition, in the sixth example, correction of the image distortion based on the presence of the tilt angle θr and the projection angle is not performed when the image is projected onto the wall 1450 in front of the user.

In this manner, if the image distortion and the projection angle are not corrected based on the tilt angle of the portable information terminal 10, the projected image will be distorted into a trapezoidal shape due to the presence of the tilt angle θr from the horizontal direction H. In addition, the position of the projected image with respect to the wall 1450 will be shifted downward.

In contrast, in the seventh example shown in FIG. 21, the controller 114 detects the tilt angle of the portable information terminal 10, that is, the posture of the terminal body 11. Then, as in the seventh example shown in FIG. 21, the controller 114 performs the projection angle control of the image such that the image is projected almost perpendicular to the wall 1450 and the projection angle of the image is upward from a reference projection opening direction PA. For example, as shown in FIG. 21, the projection angle is controlled such that the optical axis of the projection light 10*p* becomes an optical axis A2 which is almost perpendicular to the wall 1450. Such correction of the optical axis of the projection light 10*p* is mainly performed by the projection angle control, and is effective in improving visibility of the projected image, as the position at which the image is projected is changed upward and distortion of the image is reduced.

FIG. 22A is a front view of the portable information terminal 10 according to an eighth example. FIG. 22B is a side view of the portable information terminal 10 according to the eighth example. In addition, FIG. 23 is a front view of the portable information terminal 10 according to a ninth example. In the examples shown in FIGS. 22A, 22B, and 23, the portable information terminal 10 is worn on the outside of the left arm of the user where the image which is display content is projected.

In the eighth example shown in FIGS. 22A and 22B, the attachment 21 is rotated, the projection opening direction PA is set to the six o'clock direction, and the image is projected onto the table 1500 on which the user's left arm LH is placed. When the user assumes a posture such that the front-back direction of the portable information terminal 10 worn on the arm is aligned with the front-back direction of the user, the proximal side of the arm is often lifted and tilted due to the structure and shape of the human skeleton, joints, or arms. In the eighth example the front-back direction X of the portable information terminal 10 is tilted at a tilt angle θr with respect to the horizontal direction H. In addition, in the eighth example, correction of the projection angle based on the presence of the tilt angle θr is not performed when the image is projected onto the table 1500 on which the user's left arm LH is placed. That is, the optical axis of the projection light 10*p* becomes an optical axis A3 which is parallel to the front-back direction X in the display surface of the terminal body 11.

In this manner, if the projection angle is not corrected based on the tilt angle of the portable information terminal 10, the projection light 10*p* representing the image is projected upward from the horizontal direction H, and the image is hardly projected onto the table 1500 due to the presence of the tilt angle θr from the horizontal direction H.

In contrast, in the ninth example, the controller 114 detects the tilt angle of the attachment 21, that is, the posture of the terminal body 11. Then, as in the ninth example shown in FIG. 23, the controller 114 performs the projection angle control of the image such that the image is projected onto the table 1500 and the projection angle of the image is downward from the reference projection opening direction PA. For example, as shown in FIG. 23, the projection angle is controlled such that the optical axis of the projection light 10*p* becomes an optical axis A4 which intersects near the left arm LH with respect to the table 1500.

Such correction of the optical axis of the projection light 10*p* is mainly performed by the image projection angle control, and is effective in improving visibility of the projected image, as the position at which the image is projected is changed downward and distortion of the image is reduced.

Note that the above-described image rotation control and image shape control may be realized by optical methods that manipulate the optical system, or by image processing methods that manipulate image information or image data. In the case of the present embodiment, since it is more practical to have a lightweight and small projector 22 that projects an image, it is more preferable to apply the latter image processing method which does not require a mechanism to manipulate the optical system.

In each of the above-described examples, the correction based on the rotation operation of the attachment 21, that is, the rotation angle position, and the correction based on the posture of the terminal body 11, that is, the tilt angle, have been described separately for clarity. However, it goes without saying that these corrections may be performed together.

As described above, the controller 114 has a function for detecting the rotation angle of the bezel 213 and the tilt angle of the portable information terminal 10 based on a predetermined mechanism or sensor. Based on the attachment rotation position and the terminal body posture obtained by such functions, the controller 114 can perform various display correction processes when projecting the image or video by the projector 22.

<Initial Settings for Projection Control According to Attachment State>

The portable information terminal 10 has a function of initial settings of the projection control. The initial settings of the projection control means that appropriate projection control settings are made in advance according to the attachment state of the portable information terminal 10 such that the image which is display content is projected with good visibility.

For example, if the portable information terminal 10 is worn on the outside of the user's right arm and the attachment rotation position is set such that the projection opening 25 of the projector 22 is directed toward the nine o'clock direction, it is assumed that the image which is display content will be projected onto the back of the user's right hand. Therefore, in such a situation, the projection control suitable for projecting the image onto the back of the right hand is set in advance. For example, the rotation control is set such that the image is rotated 90 degrees clockwise to properly align the image vertically and horizontally. In addition, the shape control is set such that a width of the image becomes narrower on the far side of the image from the projection opening 25 to correct the trapezoidal distortion of the image. Further, since a surface of the back of the hand is relatively narrow, the projection angle control is set such that the projection angle is slightly downward from a direction of the display surface of the terminal body 11 so as to not spread the image too much.

For example, if the portable information terminal 10 is worn on the outside of the user's left arm and the projection opening 25 of the projector 22 is set to be directed toward the 12 o'clock direction, it is assumed that the image which is display content will be projected onto the wall in front of the user. Therefore, in such a situation, the projection control suitable for projecting the image onto the wall in front of the user is set in advance. For example, the rotation control is set such that the image does not rotate and is properly positioned vertically and horizontally. In addition, the outside of the arm naturally leans toward the wall in front due to the structure of the human body, and thus, the image tends to be projected diagonally downward with respect to the wall. Therefore, the projection angle control is set such that a projection direction is slightly upward from the direction of the display surface of the terminal body 11 to have the image projected perpendicular to the wall.

Note that, in the initial settings of the projection control, the image shape control may be set instead of the projection angle control, or conversely, the projection angle control may be set instead of the image shape control, or both projection angle control and image shape control may be set simultaneously, in order to improve visibility of the image.

In addition, the initial settings of the projection controls, that is, the image rotation control, the image shape control, and the projection angle control, may be determined based on the posture of the terminal body 11, that is, the direction and magnitude of the tilt, as well as the outside or inside of the left or right arm on which the portable information terminal 10 is worn, and the direction of the projection opening 25.

As described above, for the user's convenience, the controller 114 identifies the attachment state of the portable information terminal 10 when the image which is display content is projected, and performs initial settings of the projection control suitable for the identified attachment state. The attachment state of the portable information terminal 10 includes the attachment position of the portable information terminal, the attachment rotation position, the terminal body posture, and the like.

In the present example, four types of options are provided as attachment positions: outside of the left arm, outside of the right arm, inside of the left arm, and inside of the right arm. In addition, as for the attachment rotation position, twelve types of options are provided as the positions of the pin 23 of the bezel 213, the positions being at one hour increments from twelve o'clock to eleven o'clock. In addition, nine types of options are provided as the terminal body posture: horizontal, front-upward tilt (small), rear-upward tilt (small), left-upward tilt (small), right-upward tilt (small), front-upward tilt (large), rear-upward tilt (large), left-upward tilt (large), and right-upward tilt (large).

A plurality of different setting information is stored in the storage 125. The plurality of different setting information include the attachment state of the portable information terminal 10 associated with the setting information representing the initial settings of the projection control suitable for the attachment state. The controller 114 reads the setting information corresponding to the identified attachment state from the storage 125, and performs the initial settings of the projection control based on the read setting information.

FIG. 24 is a drawing showing an example of a setting information table. As shown in FIG. 24, the setting information table is prepared by, for example, summarizing the setting information of the projection control to be set for each attachment position 41 the portable information terminal. The example shown in FIG. 24 shows a setting information table T01 that is applicable when the attachment position of the portable information terminal 10 is the outside of the left arm, a setting information table T02 that is applicable when the attachment position is the outside of the right arm, a setting information table T03 that is applicable when the attachment position is the inside of the left arm, and a setting information table T04 that is applicable when the attachment position is the inside of the right arm.

In the present example, the setting information tables T01 to T04 are stored in the storage 125. Note that the setting information table may be a single table. In addition, the setting information table may be stored in the memory 132 on the terminal body 11 side or in the memory 206 on the attachment 21 side.

FIG. 25 is a drawing showing an example of detailed contents of the setting information table T01. FIG. 25 is shown as a representative example among the setting information tables T01 to T04 in order to facilitate understanding of the tables. As shown in FIG. 25, the setting information table T01 has items "attachment rotation position" and "terminal body posture" as combination items, based on the assumption that the attachment position is "outside" of the "left arm," and "setting information" is associated with the combination of these items. Here, each setting information is represented by J(j1, j2, j3, j4), where j1 is a numerical value corresponding to whether the attachment position is on the left arm the right arm, j2 is a numerical value corresponding to whether the attachment position is inside or outside the arm, j3 is a numerical value corresponding to the attachment rotation position, and j4 is a numerical value corresponding to the terminal body posture.

In the present example, the "attachment rotation position" is the rotation position of the attachment 21, and is information that indicates the rotation position of the projector 22 or, for example, the direction on a typical clock the position of the pin 23 as its reference position is in. The "attachment rotation position" specifically indicates whether it is in the twelve o'clock direction, the one o'clock direction, the two o'clock direction, the eleven o'clock direction, or the like.

FIG. 26 is a drawing showing a table AP1 that shows examples of correspondence between the attachment rotation positions and attachment rotation angles α. The bezel rotation angle & is set to 0 degrees when the projector is positioned at the three o'clock direction by initialization when the bezel is attached. As shown in FIG. 26, for example, the attachment rotation position is in the three o'clock direction when $345° \leq \alpha < 15°$. As another example, the attachment rotation position is in the twelve o'clock direction when $255° \leq \alpha < 285°$.

In addition, in the present example, the "terminal body posture" is information indicating the magnitude to which the display surface of the terminal body 11 is tilted in any direction. Specifically, the "terminal body posture" indicates whether the terminal body is horizontal or has a front-upward tilt (small), a rear-upward tilt (small), a right-upward tilt (small), a left-upward tilt (small), a front-upward tilt (large), a rear-upward tilt (large), a right-upward tilt (large), or a left-upward tilt (large). For example, a small front-upward tilt means that the front of the terminal body 11 is tilted upward at a small angle. In addition, a large right-upward tilt means that a right side of the terminal body 11 is tilted upward at a large angle.

FIG. 27 is a drawing showing a table HS1 that shows examples of correspondence between terminal body postures, tilt directions and upward tilt angles β of the terminal body. The tilt angle β is 0 degrees when the display surface of the terminal body 11 is horizontal. For example, as shown in FIG. 27, the terminal body posture is horizontal when the front/rear/left/right tilt has the upward tilt angle $\beta < 15°$. In addition, for example, when the tilt direction is forward and $30° > \beta \geq 15°$, the front-upward tilt is "small". In addition, for example, when the tilt direction is to the right and $\beta \geq 30°$, the right upper tilt is "large".

FIG. 28 is a drawing showing an example of contents of setting information associated with the setting information table T01. In FIG. 28, a table T11 is represented as an example of the contents of setting information. For example, in the example shown in FIG. 28, the setting information J (1,1,12,1) is the setting information when the attachment position of the portable information terminal 10 is the outside of the left arm, the attachment rotation position is the twelve o'clock direction, and the terminal body posture is horizontal. The setting contents of the setting information include settings for rotation control of the display content, shape control, and projection angle control.

In the example shown in FIG. 28, for example, the setting contents of the setting information J (1, 1, 12, 1) are settings in which rotation regarding the rotation control of the display content is set to 0 degrees, the shape control of the display content is linear (that is, no shape correction), and the projection angle regarding the projection angle control is set to 0 degrees. As another example, the setting contents of the setting information J (1, 1, 6, 3) are settings in which rotation regarding the rotation control of the display content is set to 180 degrees clockwise (CW), the shape control of the display content is one in which correction to narrow the far side of the image is performed, and the projection angle regarding the projection angle control is set to 30 degrees downward.

The controller 114 refers to the above-described setting information table, reads the setting information according to the detected attachment state, and performs initial settings of the projection control based on the setting information. In the present example, in order to facilitate understanding, the attachment state and setting information are described as being simple. However, the attachment state and setting information may actually be defined by more complex and detailed items. According to this configuration in which initial settings of the projection control is performed, the projection control suitable for the attachment state of the portable information terminal is performed in advance, and thus, visibility of the display content can be improved without a subsequent adjustment of the projection control, or only with a subsequent minor adjustment of the projection control by the user.

Note that the initial settings of the projection control may be performed based on information input by the user. For example, the user may input the attachment state of the portable information terminal 10, and the controller 114 may perform the initial settings of the projection control suitable for the inputted attachment state. Alternatively, the user may directly perform the initial or current settings of the projection control, make minor adjustments, and the like.

Hereinafter, several examples of processing methods for automatically identifying the attachment state of the portable information terminal will be explained with reference to the drawings.

<Determining Which Arm the Terminal is Worn>

FIG. 29 is a flow diagram showing an example of a process for automatically determining the left or right arm on which the portable information terminal 10 is worn. The flow diagram shown in FIG. 29 represents an example of the processing procedure by the controller 114 for determining the left or right arm of the user on which the portable information terminal 10 is worn. An algorithm for this determination process is based on the assumption that the user is often in a state where the arm is pointing downward (gravitational direction) while walking.

In step S2901, a determination is made as to whether or not the user is walking. Specifically, the controller 114 determines whether or not the user wearing the portable information terminal 10 is walking based on history of output of at least one of the acceleration sensor 133 and the gyro sensor 136 for a certain period of time.

If the user is walking, the output of the acceleration sensor 133 or the gyro sensor 136 may repeatedly change by a certain level or more. Therefore, whether or not the user is walking can be determined based on whether or not such a characteristic is observed.

In the above-described determination, if it is determined that the user is walking (S2901: Yes), the controller 114 causes the step to be executed to proceed to S2902. On the other hand, if it is determined that the user is not walking (S2901: No), the controller 114 causes the step to be executed to shift to S2906.

In step S2902, it is determined whether or not the gravitational direction of the portable information terminal 10 is in the three o'clock direction. Specifically, the controller 114 determines whether or not the gravitational direction of the portable information terminal 10 is in the vicinity of the three o'clock direction of the wristwatch based on the output of the acceleration sensor 133. In this determination, if it is determined that the gravitational direction is in the vicinity of the three o'clock direction (S2902: Yes), the controller 114 causes the step to be executed to proceed to S2904. On the other hand, if it is determined that the gravitational direction is not in the vicinity of the three o'clock direction (S2902: No), the controller 114 causes the step to be executed to shift to S2903.

In step S2903, it is determined whether or not the gravitational direction of the portable information terminal 10 is in the nine o'clock direction. Specifically, the controller 114 determines whether or not the gravitational direction of the portable information terminal 10 is in the vicinity of the nine o'clock direction of the wristwatch based on the output of the acceleration sensor 133. In this determination, it is determined that the gravitational direction is in the vicinity of the nine o'clock direction (S2903: Yes), the controller 114 causes the step to be executed to proceed to S2905. On the other hand, if it is determined that the gravitational direction is not in the vicinity of the three o'clock direction (S2903: No), the controller 114 causes the step to be executed to shift to S2906.

In step S2904, when the user is walking and it is determined that the gravitational direction of the output of the acceleration sensor is the three o'clock direction, the process to be executed includes a process of counting up a variable LW corresponding to that determination result. Specifically, the controller 114 adds 1 to the value of the variable LW to make it a new value of the variable LW. When step S2904 is executed, the controller 114 causes the step to be executed to shift to S2906.

In S2905, when the user is walking and it is determined that the gravitational direction of the output of the acceleration sensor is the nine o'clock direction, the process to be executed includes a process of counting up a variable RW corresponding to that determination result. Specifically, the controller 114 adds 1 to the value of the variable RW to make it a new value of the variable RW. When step S2905 is executed, the controller 114 causes the step to be executed to shift to S2906.

Note that the variables LW and RW are variables used in the program of the controller 114, and are initialized and set to zero when the power supply of the portable information terminal 10 is turned on or when a system reset process or the like (not shown) is performed by the user.

In step S2906, a determination is made as to whether or not there is a significant difference between the values of the variables LW and RW. Specifically, the controller 114 determines whether or not there is a situation in which either the value of the variable LW or the value of the variable RW exceeds a threshold value TH1 and in which the difference between a ratio of the value of variable LW to the total counts and a ratio of the value of the variable RW exceeds a threshold value TH2. If it is determined that there is such a situation, the controller 114 causes the step to be executed to proceed to S2907. On the other hand, if it is determined that there is no such situation, the controller 114 causes the step to be executed to return to S2901.

In step S2907, the value of the variable LW and the value of the variable RW are compared. Specifically, the controller 114 determines whether or not one of the following relationships is valid: (1) value of variable LW>value of variable RW, or (2) value of variable LW<value of variable RW. If it is determined that the relationship (1) is valid, the controller 114 determines that the user is wearing the portable information terminal 10 on the left arm (S2908) and finishes the determination process. On the other hand, if it is determined that the relationship (2) is valid, the controller 114 determines that the user is wearing the portable information terminal 10 on the right arm (S2909) and finishes the determination process.

<Determining Which Side of the Arm the Terminal is Worn>

Determination of whether the position where the portable information terminal 10 is worn is outside or inside the arm may be based on the output of the body information measurement sensor 16.

In general, the body information measurement sensor 16 irradiates a green light source onto an object and outputs a signal according to the reflected light amount from the object. A thickness or number of blood vessels passing near the surface of the arm, or the blood flow, differs between the outside of the arm (back-of-hand side) and the inside of the arm (opposite to the back of the hand). In addition, the amount of green light reflected differs according to the blood flow. That is, the body information measurement sensor 16 outputs different signals when the green light is irradiated on the outside of the arm and when the green light is irradiated on the inside of the arm. Utilizing such a characteristic makes it possible to determine whether the attachment position of the portable information terminal 10 is the outside or inside of the arm based on the output of the body information measurement sensor 16.

FIG. 30 is a flow diagram showing an example of a process for determining the inside or outside of the arm on which the portable information terminal 10 is worn.

As shown in FIG. 30, in step S3001, light emission to the arm is performed. Specifically, the controller 114 controls the body information measurement sensor 16, and the body information measurement sensor 16 emits the green light to the user's arm.

In step S3002, measurement of the light reflectance of the arm is performed. Specifically, the controller 114 receives the signal output from the body information measurement sensor 16, detects the amount of light reflected from the arm on which the green light is emitted, and measures the light reflectance of the arm based on that amount of light.

In step S3003, it is determined whether or not the measured light reflectance exceeds a threshold value. Specifically, the controller 114 determines whether or not the measured light reflectance of the arm exceeds a predetermined threshold value th. In this determination, if it is determined that the light reflectance exceeds the threshold value th (S2003: Yes), the controller 114 causes the processing step to proceed to step 3004. On the other hand, if it is determined that the light reflectance does not exceed the threshold value th (S3003: No), the controller 114 causes the processing step to proceed to step S3005.

In step S3004, the controller 114 determines that the portable information terminal 10 is worn on the outside of the user's arm. On the other hand, in step S3005, the controller 114 determines that the portable information terminal 10 is worn on the inside of the user's arm.

As described above, if it is possible to automatically determine whether the portable information terminal 10 is worn on the left or right arm, or on the inside or outside of the arm, that is, whether it is worn on the outside of the left arm, the inside of the left arm, the outside of the right arm, or the inside of the right arm, there is no need for the user to operate to set the wearing location, thereby improving convenience.

<Processing Flow in the Portable Information Terminal>

This section describes a processing flow related to the projection of display content for the portable information terminal 10.

FIG. 31 is a flow diagram showing an example of the process related to the projection of display content for the portable information terminal 10.

As shown in FIG. 31, in step S3101, identifying the attachment state of the portable information terminal 10 is performed. Specifically, the controller 114 identifies the terminal attachment position, the attachment rotation position, and the terminal body posture as items of the attachment state of the portable information terminal 10. For example, the method described above is used to identify each item of the attachment state.

In step S3102, reading of the setting information of the projection control is performed. Specifically, the controller 114 refers to the setting information table stored in the storage 125 and reads from the storage 125 the setting information of the projection control associated with the combination of the items of the identified attachment state. That is, according to the identified attachment state, the controller 114 reads the setting information of the projection control suitable for that attachment state.

In step S3103, initial settings of the projection control is performed. Specifically, the controller 114 performs initial settings of the image rotation control, the image shape control, and the image projection angle control based on the read setting information.

In step S3104, a determination is made as to whether or not there has been a change in the attachment rotation position. Specifically, the controller 114 determines whether or not there has been a change in the attachment rotation position detected almost in real time. In this determination, if it is determined that there has been a change (S3104: No), the controller 114 causes the processing step to return to step S3101. On the other hand, if it is determined there has been no change (S3104: Yes), the controller 114 causes the processing step to proceed to step S3105.

In step S3105, projection of the image is performed. Specifically, the controller 114 performs the set image rotation control and image shape control on the image which is display content to correct the image. Then, the controller 114 sends image information or image data representing the corrected image and the setting information of the projection angle control to the projector 22. The controller 204 on the projector 22 side controls the projection angle based on the received setting information of the projection angle control. In addition, the controller 204 controls each part related to the projection of the image to project the image represented by the received image data.

In step S3106, processing is performed to determine whether or not there is adjustment of the projection control, the rotation control of the display content, the shape control, and the projection angle control by the user operation. Specifically, the controller 114 executes the process of detecting the user operation, and when the user operation is detected, the controller 114 determines whether or not there is adjustment of the projection control, the rotation control of the display content, the shape control, and the projection angle control based on the information input by the user. In this determination, if it is determined that there is adjustment (S1506: Yes), a process is performed in which the processing step proceeds to step S1507. On the other hand, if it is determined that there is no adjustment (S1506: No), a process is performed in which the processing step proceeds to step S1508.

In step S1507, a process of adjusting the projection control is performed. Specifically, the controller 114 adjusts the projection control based on adjustment information of the projection control input by the user.

In step S1508, a determination is made as to whether or not to finish the projection. Specifically, the controller 114 checks whether or not a reason for finishing the projection has occurred. The reason for finishing the projection can include, for example, an error occurring in the processing, or an instruction to finish the projection input by the user. When the reason to finish the projection has occurred, it is determined to be the end of the projection, and when no reason to finish the projection has occurred, it is determined not to be the end of the projection. In this determination, if it is determined that the projection is finished (S3108: Yes), the projection is finished. On the other hand, if it is determined that the projection is not finished (S3108: No), the controller 114 causes the processing step to return to step S1504.

According to the portable information terminal according to the first embodiment, since it has the function of the image rotation control, when projecting an image which is display content, the projected image can be rotated to a rotation angle suitable for the attachment state of the portable information terminal. For example, horizontality of the image can be maintained even if the direction in which the image is projected changes. As a result, visibility of the displayed contents can be improved. In particular, when display content is shared with other users, it is possible to project the display content with good visibility for other users as well.

In addition, according to the portable information terminal according to the first embodiment, since it has the function of the image shape control, when projecting the image which is display content, the image can be deformed to a shape suitable for the attachment state of the portable information terminal. For example, if a surface of the object on which the image is projected is tilted with respect to the projection direction, the image will have the trapezoidal distortion, which can be corrected. As a result, visibility of the display content can be improved. In particular, when display content is shared with other users, it is possible to project the display content with good visibility for other users as well.

In addition, according to the portable information terminal according to the first embodiment, since it has a function of the projection angle control, when projecting the image which is display content, the projection angle can be corrected to an angle suitable for the attachment state of the portable information terminal. For example, if the surface of the object on which the image is projected is tilted with respect to the projection direction, the image will have the trapezoidal distortion, which can be corrected. As a result, visibility of the display content can be improved. In particular, when display content is shared with other users, it is possible to project the display content with good visibility for other users as well.

In addition, according to the portable information terminal according to the first embodiment, the initial settings of the projection control is performed based on the identified attachment state of the portable information terminal, and are suitable for the projection form of the display content assumed from the attachment state, such that visibility of the projected display content can be further improved. In particular, when display content is shared with other users, it is possible to project the display content with good visibility for other users as well.

In addition, according to the portable information terminal according to the first embodiment, the attachment state of the portable information terminal, that is, the attachment position, the attachment rotation position, and the terminal body posture, can be automatically detected using a sensor, making it possible to automatically perform the initial settings of the projection control, thereby improving convenience for the user.

In addition, according to the portable information terminal according to the first embodiment, the attachment is removably attached, and the attachment with functions other than the projector function, such as those with a camera function, can be attached to the terminal body in addition to those with projector functions. According to the portable information terminal with this configuration, the user can use the appropriate attachment according to the intended use, thereby improving convenience for the user.

In addition, according to the portable information terminal according to the first embodiment, the attachment having the projector function can be rotatably attached to the terminal body. As a result, when the projected display content is shared with other users, it is possible to project the display content in the user's preferred direction, which is convenient for the user and improves visibility of the display content for other users as well.

First Modified Example of First Embodiment

This section describes a first modified example of the first embodiment. The portable information terminal according to the first modified example has, as an attachment option that can be attached to the terminal body, an attachment with a projector whose projection opening direction is different from a radial direction of the circumference of the bezel. The projection opening direction is, for example, a tangential direction of the circumference of the bezel.

FIG. 32A is a front view of a portable information terminal 10*a* according to the first modified example of the first embodiment. In addition, FIG. 32B is a side view of the portable information terminal 10*a* according to the first modified example of the first embodiment. As shown in FIGS. 32A and 32B, the portable information terminal 10*a* has a projection opening of a projector 22*a* in an attachment 21*a*, that is, an opening that is an exit of the projection light 10*p*, formed at one end of the projector 22*a* in a longitudinal direction. That is, the portable information terminal 10A in the present example has the projection opening direction PA of the projector 22*a* as the tangential direction of the circumference of the bezel 213.

FIG. 33 is a drawing showing an example of the portable information terminal 10*a*. In the example shown in FIG. 33, the portable information terminal 10*a* is worn on the outside of the user's left arm LH, and the projection light 10*p* corresponding to an image T4 representing the characters "ABC" which is display content is projected from the projector 22 onto the back of the user's hand. In addition, in the present example, the bezel 213 is rotated by a rotation angle θd1 in order to have the image projected onto the back of the hand of the user's left arm LH. In addition, in the present example, the controller 114 does not perform the rotation control of the projected image. That is, the image without rotation correction is projected onto the back of the hand. In this case, the characters "ABC" appear to be tilted at an angle to the user.

FIG. 34 is a drawing showing a variation to the example of the portable information terminal 10*a* shown in FIG. 33. In the variation shown in FIG. 34, the controller 114 detects the rotation angle θd1 of the attachment 21A and corrects the shape of the image based on the rotation angle θd1 such that the characters "ABC" are displayed along the longitudinal direction of the arm. Therefore, according to such a configuration, the characters "ABC" appear to be displayed along the horizontal direction to the user, that is, the longitudinal direction of the arm, thereby improving visibility of the projected image.

FIG. 35 is a drawing showing an example of the setting information table. As shown in FIG. 35, the setting information table is prepared by, for example, summarizing the setting information of the projection control to be set for each attachment position of the information terminal. The example shown in FIG. 35 shows a setting information table T11 that is applicable when the attachment position of the portable information terminal 10*a* is the outside of the left arm, a setting information table T12 that is applicable when the attachment position of the portable information terminal 10*a* is the outside of the right arm, a setting information table T13 that is applicable when the attachment position of the portable information terminal 10*a* is the inside of the left arm, and a setting information table T14 that is applicable when the attachment position of the portable information terminal 10*a* is the inside of the right arm. In the present example, the setting information tables T11 to T14 are stored in the storage 125.

FIG. 36 is a drawing showing an example of detailed contents of the setting information table T11. FIG. 36 is shown as a representative example among the setting information tables T11 to T14 in order to facilitate understanding of the tables. As shown in FIG. 36, the setting information table T11 has items "projection opening direction" as well as "attachment rotation position" and "terminal body posture" as combination items, based on the assumption that the attachment position is "outside" of the "left arm", and "setting information" is associated with the combination of these items.

In the present example, the "projection opening direction" is information representing the direction of the optical axis or main axis of the projection light 10*p* emitted from the projection opening 25. For example, "radial direction" and "tangential direction" of the circumference of the bezel 213 are provided as options for the "projection opening direction".

Second Modified Example of First Embodiment

This section describes a second modified example of the first embodiment. The portable information terminal according to the second modified example has, as an attachment option that can be attached to the terminal body, an attachment in which the projector is pivotable with respect to the bezel. That is, the portable information terminal according to the second modified example is configured such that the projection direction of the image can be changed by changing the pivoting position of the projector.

FIG. 37A is a front view of the portable information terminal 10*b* according to the second modified example of the first embodiment. In addition, FIG. 37B is a side view of the portable information terminal 10*b* according to the second modified example of the first embodiment.

As shown in FIGS. 37A and 37B, the portable information terminal 10*b* has an attachment 21B configured such that the projector 22*a* is pivotable with respect to the bezel 213. The attachment 21B has a pivoting mechanism 229 that allows the projector 22*a* to pivot about an axis in a direction parallel to a direction of the display surface of the terminal body 11 with respect to the bezel 213. The projection opening direction PA of the projector 22*a* is a tangential direction of the circumference of the bezel 213, as in the first modified example.

In the present example, in addition to the above-described items, an item "projector rotation angle" is included as the attachment state of the portable information terminal. The "projector rotation angle" is information representing the rotation angle of the projector 22*a* with respect to the bezel 213, that is, a pivoting state of the projector 22*a*. The controller 114 performs initial settings f the projection control that are considered suitable according to the combination of a plurality of items including the "projector rotation angle" as the attachment state of the portable information terminal. That is, the setting information table is a table that includes the "projector rotation angle" which is the pivoting state of the projector 22*a* as one of the items to be associated with the setting information.

SECOND EMBODIMENT

This section describes the portable information terminal according to a second embodiment. The portable information terminal according to the first embodiment has a rotating bezel type attachment, whereas the portable information terminal according to the second embodiment has a terminal connection type attachment. That is, the projection direction of the image can be changed depending on a connection position of the attachment to the terminal body.

FIG. 38 is a drawing showing a configuration example of the portable information terminal 10*c* according to the second embodiment. As shown in FIG. 38, in the present example, the portable information terminal 10*c* has a terminal body 11*c* that has an almost square shape. The terminal body 11*c* has a plurality of different connection terminals, and the connection terminals are provided in each of the four vertical and horizontal directions of the terminal body 11*c*. The attachment 21C integrated with the projector is configured to be inserted into, that is, removably attached to, each of the connection terminals provided in the four vertical and horizontal directions of the terminal body 11*c*.

In the example shown in FIG. 38, the projection direction of the image or video from the attachment 21C is similar to that shown in FIG. 1. That is, in a state where the attachment 21C is attached to terminal body 11C, the image or video is projected onto an opposite side of the terminal body 11*c*.

In such a configuration, the projection opening direction is determined by the attachment position of the attachment 21C with respect to the terminal body 11*c*. Therefore, the pattern detection sensors 12*c* and 12*d* for detecting the rotation angle of the attachment 21C which are necessary for correcting the image and a detection pattern as a rotary encoder on the bezel 213 side are no longer necessary, and the structure of the portable information terminal can be simplified.

First Modified Example of Second Embodiment

This section describes a first modified example of the second embodiment. The portable information terminal according to the first modified example has, as an attachment option that can be attached to the terminal body, an attachment with a projector whose projection opening direction is different from the radial direction from a center of the terminal body. The projection opening direction is, for example, a direction orthogonal to the radial direction from the center of the terminal body.

FIG. 39 is a drawing showing the portable information terminal 10*d* according to a first modified example of the second embodiment. As shown in FIG. 39, in the present example, the portable information terminal 10*d* has an attachment 21D integrated with a projector. The projection opening direction PA of the projector in the attachment 21D is a direction orthogonal to the radial direction from the center of the terminal body 11, or more specifically, the longitudinal direction of the attachment 21D. That is, the projection opening of the projector of the attachment 21D is formed at one end of the attachment 21D in the longitudinal direction.

In such a configuration, as in the example shown in FIG. 38, the projection opening direction PA is determined by the attachment position of the attachment 21D with respect to the terminal body 11*c*. Therefore, the pattern detection sensors 12*c* and 12*d* for detecting the attachment rotation position necessary for correcting the image and the detection pattern as the rotary encoder on the attachment 21D side are no longer necessary, and the structure of the portable information terminal can be simplified.

Note that, in the first to third embodiments, the optical projection angle with respect to the projector has been described as unvaried. However, the attachment or projector may be configured such that all or part of the optical system of the projector is mechanically variable, and the controller may control the angle.

In addition, in the second modified example of the embodiments, an example has been described in which the projector is pivotable and the projection angle can be adjusted by adjusting the pivot angle. Such a configuration in which the projector itself is pivotable can be applied to other embodiments or other modified examples.

In addition, the terminal body of the portable information terminal according to the first to third embodiments is equipped with a gyro sensor. Therefore, for example, when a user projects an image or the like onto a front wall while wearing the portable information terminal on the user's arm, vibration or shaking of the user's arm can be detected, and image stabilization can be performed by image processing.

In addition, in the first to third embodiments, an example has been shown in which an electrical connection of power and signals between the terminal body and the attachment of the portable information terminal is realized using the slip ring and the terminal. However, instead of such a configuration, the electrical connection of the signals, that is, transmission and reception of the signals, may be realized by a proximity wireless connection, or the electrical connection of power may be realized by wireless power supply with the electrical connection of the signals realized by the proximity wireless connection. According to such a configuration, the number of sliding parts in the electrical connection can be reduced, thereby reducing mechanical wear and tear, and making it easier to waterproof the structure. Further, it is possible to reduce manufacturing costs.

In addition, in the first to third embodiments, an example has been shown in which the mobile communication interface is mounted on the terminal body of the portable information terminal. However, the mobile communication interface may be mounted on the removably attached attachment side instead of the terminal body. In addition, the attachment may be provided with different functions, such as one with a communication function such as LTE, another with an imaging function, and so on. In this manner, the user can freely expand the functions of the portable information terminal by acquiring the attachment with the desired function as needed. That is, a product configuration of the portable information terminal can be made functionally expandable.

In addition, in the first to third embodiments, the projection controls, that is, the image rotation control, the image shape control, and the projection angle control, are performed by the terminal body side controller. However, all or part of the projection controls may be performed by the attachment side controller. For example, the terminal body side controller may acquire information required for the above-described projection controls from the sensor and the like and send the information to the attachment, and the attachment side controller may perform the projection controls based on the received information. In addition, for example, the terminal body side controller may send information of the image to be projected to the attachment, and the attachment side controller may acquire information required for the above-described projection controls from the sensor and the like mounted therein and perform the above-described projection controls.

Each embodiment and variations described above have been described in detail for the purpose of explaining the invention in an easily understandable manner, and are not necessarily limited to have all the described configurations. In addition, it is possible to replace part of the configuration of one example with the configuration of another example, and to add the configuration of another example to the configuration of one example. In addition, it is possible to add, remove, or replace some of the configurations of each example.

In addition, the configuration of each of the above-described examples may be configured such that some or all are realized by hardware or by a program executed by a processor. In addition, control lines and information lines are those considered necessary for explanation, and not all control lines and information lines are necessarily shown in the product. In practice, almost all components may be considered to be interconnected.

LIST OF REFERENCE SIGNS

10 . . . portable information terminal, 10*p* . . . projection light, 11 . . . terminal body, 12 . . . housing, 12*a* . . . display surface side convex portion, 12*b* . . . sensor side convex portion, 12*c*, 12*d* . . . pattern detection sensor, 12*e* . . . housing side bezel backside contact surface, 13 . . . touch screen, 14 . . . marker, 15 . . . control board, 16 . . . body information measurement sensor, 17 . . . belt, 18*a*-18*d* . . . slip ring, 21 . . . attachment, 22 . . . projector, 22*i* . . . internal space, 23 . . . pin, 24 . . . clasp, 25 . . . projection opening, 26*a*-26*d* . . . terminal, 27 . . . control board, 114 . . . controller, 191 . . . home button, 192 . . . reset button, 204 . . . controller, 211 . . . first semicircular part, 212 . . . second semicircular part, 213 . . . bezel, 213*a* . . . first light reflecting surface, 213*b* . . . second light reflecting surface

The invention claimed is:

1. A portable information terminal to be worn on an arm, comprising:
 a terminal body; and
 an attachment attached to the terminal body and communicatively connected to the terminal body,
 wherein the attachment has a projector for projecting an image based on image information obtained from the terminal body, and is configured such that a projection opening direction of the projector is variable with respect to the terminal body,
 wherein the terminal body or the attachment identifies a state of the portable information terminal including a position of the attachment with respect to the terminal body, and wherein the terminal body or the attachment performs a projection control of the image based on the identified state.

2. The portable information terminal according to claim 1, wherein the terminal body or the attachment stores setting information of a plurality of different projection controls, and wherein the terminal body or the attachment reads the setting information corresponding to the identified state and performs setting of the projection control.

3. The portable information terminal according to claim 2, wherein the projection control includes rotation control of the image.

4. The portable information terminal according to claim 2, wherein the projection control includes a shape control of the image.

5. The portable information terminal according to claim 2, wherein the projection control includes a projection angle control of the image.

6. The portable information terminal according to claim 2, wherein the terminal body has a circumferential periphery, wherein the attachment is attached to the periphery, and is configured to be rotatable with respect to the terminal body, and wherein the terminal body or the attachment identifies a rotation position of the attachment.

7. The portable information terminal according to claim 2, wherein the terminal body has a plurality of different connection terminals to which the attachment is connected, wherein the attachment is connected to any one of the plurality of connection terminals, and wherein the terminal body or the attachment identifies a position of the attachment by identifying which of the connection terminals is connected to the attachment.

8. The portable information terminal according to claim 2, wherein the state of the portable information terminal includes at least one of an attachment position of the portable information terminal with respect to a user, and posture of the terminal body.

9. The portable information terminal according to claim 2, wherein the state of the portable information terminal includes an attachment position of the portable information terminal, wherein the terminal body has a sensor for outputting signals according to acceleration occurring in the terminal body, and wherein the terminal body or the attachment identifies the left or right arm on which the terminal body is worn based on history of output by the sensor as information contained in the attachment position.

10. The portable information terminal according to claim 6, wherein the attachment is configured to be removably attached to the terminal body.

11. The portable information terminal according to claim 1, wherein the projector is configured to be pivotable with respect to the attachment, and wherein the state 41 the portable information terminal includes a pivoting state of the projector.

12. The portable information terminal according to claim 3, wherein the terminal body or the attachment performs a rotation control of the image such that a vertical relationship of the image is maintained according to the identified state.

13. The portable information terminal according to claim 4, wherein the terminal body or the attachment performs a shape control of the image according to the identified state such that distortion of the image is reduced.

14. The portable information terminal according to claim 5, wherein the terminal body or the attachment performs a projection angle control of the image such that, when a position of the attachment is at a position where the projection opening direction is in a twelve o'clock direction of a clock, the image is projected upward from a reference point, and when the position of the attachment is at a position where the projection opening direction is in a six o'clock direction of a clock, the image is projected downward from the reference point.

15. A terminal body configuring a portable information terminal to be worn on an arm, the terminal body comprising:

a mechanism for attaching an attachment having a projector for projecting an image, the attachment configured such that a projection opening direction of the projector is variable with respect to the terminal body;

a communication unit for exchanging information with the attachment;

generating means for generating image information to be sent to the attachment via the communication unit; and acquirement means for acquiring information representing a projection opening direction from the attachment and a position of the attachment with respect to the terminal body, wherein the acquirement means edits the image information based on the acquired information.

16. The terminal body according to claim 15, wherein the terminal body stores setting information of projection controls of a plurality of different images, reads the setting information corresponding to a projection opening direction represented by the acquired information, and performs editing of the image information.

17. The terminal body according to claim 15, wherein editing of the image information includes at least one of an image rotation control and an image shape control.

18. An attachment configuring a portable information terminal to be worn on an arm, wherein the attachment is attached to a main body of the portable information terminal, and is communicatively connected to the main body, wherein the attachment has a projector for projecting an image based on image information obtained from the main body, and is configured such that a projection opening direction of the projector is variable with respect to the main body, wherein the main body or the attachment identifies a state of the portable information terminal including a position of the attachment with respect to the main body, and wherein the main body or the attachment performs a projection control of the image based on the identified state.

19. The attachment according to claim 18, wherein the main body or the attachment stores setting information of a plurality of different projection controls, and wherein the main body or the attachment reads the setting information corresponding to the identified state and performs setting of the projection control.

20. The attachment according to claim 18, wherein the projection control includes at least one of an image rotation control, an image shape control, and a projection angle control.

* * * * *